(12) United States Patent
Naveh et al.

(10) Patent No.: US 12,073,291 B2
(45) Date of Patent: Aug. 27, 2024

(54) FUNCTIONAL-LEVEL PROCESSING COMPONENT FOR QUANTUM COMPUTERS

(71) Applicant: Classiq Technologies LTD., Tel Aviv (IL)

(72) Inventors: Amir Naveh, Haifa (IL); Shmuel Ur, Shorashim (IL); Yehuda Naveh, Tel-Aviv Yafo (IL); Ofek Kirzner, Haifa (IL); Ravid Alon, Tel Aviv (IL); Tal Goren, Kibbutz Nahsholim (IL); Adam Goldfeld, Kiryat Motzkin (IL); Nir Minerbi, Haifa (IL)

(73) Assignee: CLASSIQ TECHNOLOGIES LTD., Tel Aviv (IL)

( * ) Notice: Subject to any disclaimer, the term of this patent is extended or adjusted under 35 U.S.C. 154(b) by 525 days.

(21) Appl. No.: 17/450,584

(22) Filed: Oct. 12, 2021

(65) Prior Publication Data
US 2023/0111924 A1 Apr. 13, 2023

(51) Int. Cl.
*G06N 10/00* (2022.01)
*G06F 8/30* (2018.01)

(52) U.S. Cl.
CPC ............ *G06N 10/00* (2019.01); *G06F 8/311* (2013.01)

(58) Field of Classification Search
CPC ..................................................... G06N 10/00
USPC ......................................................... 716/104
See application file for complete search history.

(56) References Cited

U.S. PATENT DOCUMENTS

2019/0121921 A1* 4/2019 Nam ................. G06F 30/39

FOREIGN PATENT DOCUMENTS

WO 2020131411 A1 6/2020

OTHER PUBLICATIONS

Haner, T., Steiger, D.S., Svore, K., & Troyer, M. (2018). A software methodology for compiling quantum programs. Quantum Science Technology, 3(2), 020501. Apr. 30, 2018 (Apr. 30, 2018).
Sivarajah, S., Dilkes, S., Cowtan, A., Simmons, W., Edgington, A., & Duncan, R. (2021), "A retargetable compiler for NISQ devices. Quantum Science and Technology" 6(1), 014003, Jan. 31, 2021 (Jan. 31, 2021).
International Search Report from International Application No. PCT/IL2022/050939 dated Apr. 5, 2023, 16 pgs.

* cited by examiner

*Primary Examiner* — Eric D Lee
(74) *Attorney, Agent, or Firm* — Tutunjian & Bitetto, P.C.

(57) ABSTRACT

A method, system and product comprising: obtaining a functional-level representation of a quantum circuit that comprises a functional block, wherein the functional block defines an operation of the quantum circuit over at least two cycles; selecting from a function library an implementation for the functional block, wherein the function library comprises a plurality of alternative implementations of the functional block, wherein each implementation of the plurality of alternative implementations is configured to provide a same functionality of the functional block and is applicable to a quantum computer to be used for executing the quantum circuit; and generating a gate-level representation of the quantum circuit that comprises the implementation for the functional block.

20 Claims, 12 Drawing Sheets

FUNCTIONAL-LEVEL PROCESSING COMPONENT FOR QUANTUM COMPUTERS

TECHNICAL FIELD

The present disclosure relates to quantum computing in general, and to providing a functional-level processing component for quantum programs, in particular.

BACKGROUND

Quantum computing is a computational paradigm that is fundamentally different from classic computing. In contrast to classic computing, which utilizes bits, quantum computing utilizes qubits. The qubits have unique features, as each qubit can be in superposition, several qubits can be entangled, and all operations on qubits besides measurement, referred to as quantum gates, must be reversible. Temporarily computed values are stored on additional helper qubits, referred to as auxiliary qubits. Qubits are a limited resource; therefore, the use of auxiliary qubits is restricted, and synthesis must find circuits that satisfy the number of available qubits.

BRIEF SUMMARY

One exemplary embodiment of the disclosed subject matter is a method comprising: obtaining a functional-level representation of a quantum circuit, wherein the functional-level representation of the quantum circuit comprises a functional block within the quantum circuit, wherein the functional block defines an operation of the quantum circuit over at least two cycles; selecting from a function library an implementation for the functional block, wherein the function library comprises a plurality of alternative implementations of the functional block, wherein each implementation of the plurality of alternative implementations is configured to provide a same functionality of the functional block and is applicable to a quantum computer to be used for executing the quantum circuit; and generating a gate-level representation of the quantum circuit, wherein the gate-level representation of the quantum circuit comprises the implementation for the functional block, wherein the gate-level representation of the quantum circuit comprises a set of qubits and a set of gates, wherein each gate of the set of gates defining operations on the set of qubits or portion thereof by the quantum circuit at a different cycle.

Optionally, each of the plurality of alternative implementations has properties, wherein said selecting is performed based on the properties.

Optionally, the properties comprise a number of cycles of the alternative implementation; a number of qubits utilized by the alternative implementation; an entanglement caused by the alternative implementation; a number of auxiliary qubits utilized by the alternative implementation; a number of auxiliary qubits cleaned by the alternative implementation; a cycle in which an auxiliary qubit utilized by the alternative implementation is released; a computational cost of performing cleanup of the auxiliary qubit utilized by the alternative implementation; an error rate of the alternative implementation, or the like.

Optionally, the properties of a first implementation comprise a first depth and a first number of qubits, wherein the properties of a second implementation comprise a second depth and a second number of qubits, wherein the first depth is larger than the second depth and the first number of qubits is smaller than the second number of qubits.

Optionally, at least a portion of the properties are determined using a pre-processing operation performed irrespective to the functional-level representation of the quantum circuit.

Optionally, said pre-processing operation is performed using quantum computing.

Optionally, said pre-processing requires at least 60 minutes.

Optionally, the functional block is implemented using at least two gates and at least two qubits.

Optionally, the method further comprises compiling the gate-level representation of the quantum circuit to synthesize an executable circuit for the quantum computer; and executing the executable circuit using the quantum computer.

Optionally, said compiling comprises: performing a connectivity independent optimization on the gate-level representation of the quantum circuit; and performing a hardware connectivity optimization on the gate-level representation of the quantum circuit.

Optionally, said compiling comprises: assigning physical qubits in the quantum computer to the set of qubits defined in the gate-level representation of the quantum circuit.

Optionally, the functional-level representation of the quantum circuit further comprises a second functional block within the quantum circuit, wherein the functional block and the second functional block are defined by the functional-level representation to co-operate via an interface.

Optionally, the functional-level representation of the quantum circuit comprises a gate-level representation of a portion of the quantum circuit in addition to the functional block representing another portion of the quantum circuit.

Optionally, the functional-level representation of the quantum circuit comprises two instances of the functional block, wherein said selecting is performed with respect to each of the two instances of the functional block, wherein for each instance a different alternative implementation is selected from the function library.

Optionally, said selecting is performed using a different optimization criterion for each of the two instances.

Optionally, said selecting is performed based on hard constraints that must be met by the quantum circuit, wherein said selecting is further based on an optimization criterion regarding the quantum circuit.

Optionally, the optimization criterion is based on a minimal number of qubits; a minimal number of cycles, or the like.

Optionally, the gate-level representation is devoid of any block that defines a function over more than a single cycle.

Another exemplary embodiment of the disclosed subject matter is a computer program product comprising a non-transitory computer readable medium retaining program instructions, which program instructions when read by a processor, cause the processor to: obtain a functional-level representation of a quantum circuit, wherein the functional-level representation of the quantum circuit comprises a functional block within the quantum circuit, wherein the functional block defines an operation of the quantum circuit over at least two cycles; select from a function library an implementation for the functional block, wherein the function library comprises a plurality of alternative implementations of the functional block, wherein each implementation of the plurality of alternative implementations is configured to provide a same functionality of the functional block and is applicable to a quantum computer to be used for executing the quantum circuit; and generate a gate-level representation of the quantum circuit, wherein the gate-level representation of the quantum circuit comprises the implementation for the functional block, wherein the gate-level representation of the quantum circuit comprises a set of qubits and a set of gates, wherein each gate of the set of gates defining operations on the set of qubits or portion thereof by the quantum circuit at a different cycle.

Yet another exemplary embodiment of the disclosed subject matter is an apparatus comprising a processor and coupled memory, said processor being adapted to: obtain a functional-level representation of a quantum circuit, wherein the functional-level representation of the quantum circuit comprises a functional block within the quantum circuit, wherein the functional block defines an operation of the quantum circuit over at least two cycles; select from a function library an implementation for the functional block, wherein the function library comprises a plurality of alternative implementations of the functional block, wherein each implementation of the plurality of alternative implementations is configured to provide a same functionality of the functional block and is applicable to a quantum computer to be used for executing the quantum circuit; and generate a gate-level representation of the quantum circuit, wherein the gate-level representation of the quantum circuit comprises the implementation for the functional block, wherein the gate-level representation of the quantum circuit comprises a set of qubits and a set of gates, wherein each gate of the set of gates defining operations on the set of qubits or portion thereof by the quantum circuit at a different cycle.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
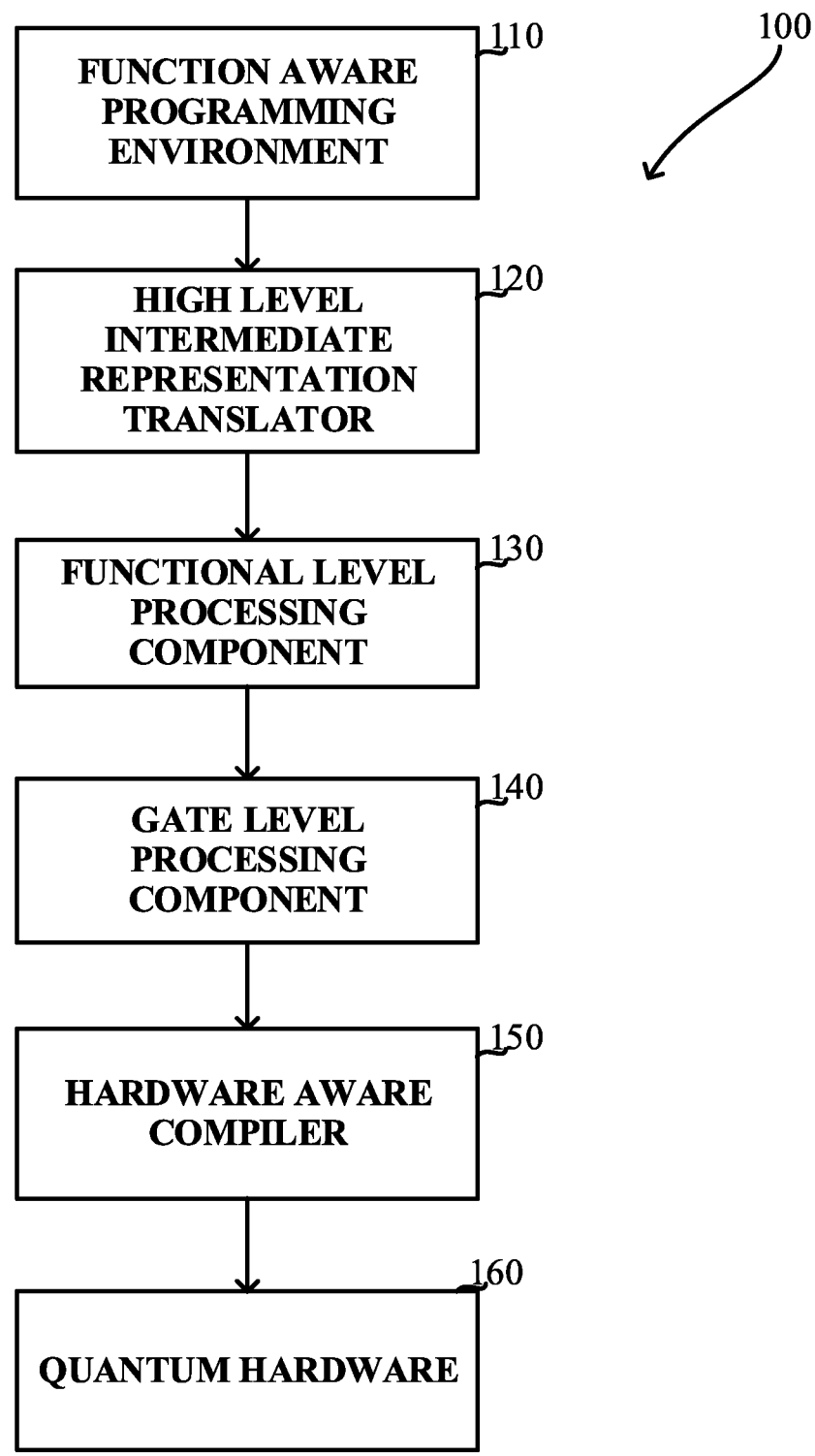
FIG. 1 shows an exemplary environment, in accordance with some exemplary embodiments of the disclosed subject matter.

One technical problem dealt with by the disclosed subject matter is to enhance a performance of a quantum program. In some exemplary embodiments, quantum programs may be programmed or created by a user, a programmer, an operator, or the like, using gate-level programming, using functional-level code, using evolutionary computing techniques such as Quantum Genetic Algorithm (QGA), using genetic algorithms, or the like. In some exemplary embodiments, after an initial quantum program is created, it may go through multiple stages before becoming an executable quantum circuit that can be executed with a quantum computer, a simulation software thereof, or the like.

Another technical problem dealt with by the disclosed subject matter is to enhance a process of implementing a functional-level quantum program. In some exemplary embodiments, compiling functional-level programs may be more complex than compiling gate-level programs. In some exemplary embodiments, a quantum program may be written in a functional-level code or other high level programming language. A functional-level program may comprise one or more function blocks. In some exemplary embodiments, a functional block may be a logical abstraction of a sub-circuit having a predetermined functionality. In some exemplary embodiments, the functional block may represent a sub-circuit that is executed over two or more cycles, using two or more qubits, using two or more quantum gates, or the like. In some cases, in addition to the one or more function blocks, the functional-level program may or may not include one or more gate-level components such as gates. For example, a high level quantum program may support the function add(a,b,c), which places the sum of states of the input qubits 'a' and 'b' into the output qubit 'c'. As other examples, the function-level program may comprise directly quantum 1-qubit gates, 2-qubit gates, or the like, such as but not limited to identity gates, Pauli gates, square root of NOT gates, controlled gates, CNOT gates, CX gates, CY gates, CZ gates, phase shift gates, controlled phase shift gates, Hadamard gates, swap gates, Toffoli gates, or the like.

In some exemplary embodiments, in order to execute a functional-level program, the functions may be converted or translated to a high-level Intermediate Representation (IR). In some exemplary embodiments, any programming language of quantum computing may be represented in the high-level IR form, such as a form representing each function in the program. The high-level IR of the functions may be translated to a low-level IR form, such as a gate-level representation, which may be compiled by a hardware-aware compiler. In some exemplary embodiments, the hardware-aware compiler may compile the low-level IR to generate a quantum circuit that is executable to the target quantum hardware. In some exemplary embodiments, the resulting quantum circuit may be executed on the target quantum hardware or simulator thereof. In some exemplary embodiments, a quality of the resulting executable quantum circuit may be evaluated using one or more evaluation tools, which may be associated to the specific quantum hardware on which the program will be executed.

In some exemplary embodiments, during the translation process from the high-level IR to the low-level IR form, an implementation of each functional block may be determined in a gate-level. In some exemplary embodiments, each functional block may have multiple viable potential implementations that implement the function and are applicable to the target quantum hardware. In some exemplary embodiments, different implementations may optimize on different criteria. In some exemplary embodiments, a tradeoff may exist between the number of qubits and the number of cycles. For example, a first gate-level implementation of a function that utilizes a greater number of qubits compared to a second gate-level implementation of the same function, may be implemented quicker, with less cycles. It may be desired to determine a gate-level implementation of a functional-level quantum program that enhances one or more criteria, parameters, or the like.

Yet another technical problem dealt with by the disclosed subject matter is selecting gate-level implementations for functional blocks. It may be desired to select an implementation that optimizes the entire program and complies with global constraints. In some exemplary embodiments, global constraints may comprise, for example, hardware constraints, user preferences, limits on an overall performance of the program, limits on resources, or the like. It is noted that in the naïve solution, a single implementation for a function per target quantum hardware may exist. However, a plurality of alternative implementations may be available, and it may be desired to consider such alternatives.

One technical solution provided by the disclosed subject matter may include using a functional-level processing component that is hardware aware, functional aware, aware of user constraints or objectives, or the like. In some exemplary embodiments, the functional-level processing component may comprise a translator, a compiler, a logic unit, a combination thereof, or the like. In some exemplary embodiments, instead of merely translating the high level program to gate level implementation, the functional-level processing component may be added as an additional layer between the high level IR translator and a gate-level processing component. In some exemplary embodiments, the functional-level processing component may be configured to obtain a high-level IR representation of a quantum circuit, or the original functional-level code, and determine an enhanced gate-level representation thereof that is configured to increase an efficiency of the quantum circuit.

In some exemplary embodiments, the functional-level processing component may obtain, as an input, a functional-level representation of a quantum circuit, such as a functional-level code, a computer program, an IR thereof, or the like. In some exemplary embodiments, the quantum program may be written directly by a programmer, such as using formal programming language, using no-code programming language, or the like. Additionally, or alternatively, the functional-level representation of the quantum program may be generated based on a program written by a programmer which may be pre-processed. In some exemplary embodiments, the program's code may comprise at least one function using two or more gates, two or more cycles, two or more qubits, or the like. In some exemplary embodiments, the code may, in some cases, comprise one or more non-functional components, such as gates. In some exemplary embodiments, the functional-level representation may comprise multiple functional blocks, which may or may not co-operate, be connected, or the like. For example, first and second functional blocks may be defined by the functional-level representation to co-operate via an interface.

In some exemplary embodiments, the functional-level processing component may generate, create, or the like, a mapping of functional blocks or segments, such as in a form of a Directed Acyclic Graph (DAG) diagram, or using any other mapping. In some exemplary embodiments, a functional block may represent a function within the quantum circuit, and may define an operation of the quantum circuit over at least two cycles. In some exemplary embodiments, the mapping may indicate relationships between the functional blocks, such as a precedence between functional blocks, an order between them, a temporal relationship, or the like. In some exemplary embodiments, the mapping may indicate temporal constraints, defining which functions must be completed before other functions are invoked. Additionally, or alternatively, the mapping may define an output-input interface between functional blocks, such as indicating an output of one block is used as an input of another block. In some cases, in case of generating a DAG, the DAG nodes may each represent a functional block or a gate from the high-level code, and the DAG edges between the nodes may indicate a precedence relationship between the functional blocks. Additionally, or alternatively, the DAG edges may indicate an output-input relationship between the two connected functional blocks, such defining that an output of a first block is used as an input of a second block.

In some exemplary embodiments, the functional-level processing component may perform an inline process for each functional block, which may be configured to implement the functional block by replacing the content of the functional block with a gate-level implementation thereof, thereby obtaining a gate-level DAG. In some exemplary embodiments, a gate-level implementation of a functional block may include two or more gates connected to two or more qubits. In some exemplary embodiments, the gate-level implementation may be determined, such as by selecting an implementation from implementations in a pre-prepared library, dynamically generating implementation, or the like. In some exemplary embodiments, there may be several alternative valid implementations that can be used to implement the functional block.

In one scenario, the functional-level representation of the quantum circuit may include the following pseudo code representing an exemplary high-level programming code:
    Line 1: add(a,b,c)
    Line 2: add(d,e,f,)
    Line 3: add(c, f g)
wherein each add(x,y,z) function represents a function where the values of x qubit and y qubit are added and placed into z qubit. In some exemplary embodiments, the functional-level processing component may convert the code to a DAG representation, which may include functional blocks. In the current case, each functional block in the DAG may represent an add function. In the current case, since the add function in line 3 relies on outputs of the add functions in lines 1 and 2, the DAG may include edges that connect the first two functions to the third function, thereby indicating that the order of execution is constrained so as to force execution of the first two functions before the third function is executed. Additionally, or alternatively, an edge representing qubit c connects the node representing the functional block corresponding to the add function of line 1 with the node representing the functional block corresponding to the add function of line 3, indicating that the value of the c qubit outputted by the first add function is an input to the third add function in the quantum program. In some exemplary embodiments, the functional-level processing component may perform an inline process by converting each block to a respective gate-level implementation, which may or may not be identical to one another, and potentially utilize a different amount and types of resources, such as different depth (e.g., different number of cycles), different number of qubits, or the like. Additionally, or alternatively, the different implementations may differ in other properties not necessarily relating to resource utilization, such as but not limited to hardware error, accuracy error, releasing cleaned-up or dirty auxiliary qubits, or the like.

In some exemplary embodiments, the quantum circuit may be represented as a set of functional blocks ordered with a DAG mapping. In some exemplary embodiments, each functional block may correspond to a task, with one or more potential implementations, and one or more constraints. In some exemplary embodiments, the functional-level processing component may perform one or more calculations in order to determine an implementation for a functional block. In some exemplary embodiments, the functional-level processing component may be configured to determine or select an implementation of a functional block based on a functional understanding of the written functions, based on a hardware understanding of the execution hardware, based on user requirements, or the like.

In some exemplary embodiments, the functional-level processing component may select an implementation for a functional block based on one or more computational models, classifiers, rules, heuristics, or the like. In some exemplary embodiments, the functional-level processing component may select an implementation for a functional block based on hard constraints that must be met by the quantum circuit, based on an optimization criterion regarding the quantum circuit such as regarding a maximal number of qubits, a maximal number of cycles, maximal error rate, or the like. In some exemplary embodiments, the functional-level processing component may be configured to optimize the quantum circuit for a given set of tasks and constraints that are derived from the functional level understating, from the hardware resources, or the like, in order to obtain a result that is optimized for the DAG and constraints.

For example, the functional-level processing component may obtain hardware constraints, user constraints, circuit constraints, or the like, and generate a Constraint Satisfaction Problem (CSP) paradigm based thereon. Once a modeling is provided, constraints of the CSP may be defined based on desired functionality, hardware constraints, circuit constraints, topology and architecture of the quantum circuit, or the like. In some exemplary embodiments, hardware constraints may comprise constraints of the quantum computer that is attempted to be used for executing the quantum circuit, such as hardware gates that are available in the underling hardware, a type of qubits (e.g., photon type or electron type), a number of qubits available in the underling hardware, or the like. In some exemplary embodiments, user constraints may comprise a desired speed/qubit ratio, a desired cost, a desired speed, a desired duration, a desired resource consumption of a certain resource, or the like. In some exemplary embodiments, circuit constraints may comprise constraints relating to the circuit such as wiring between blocks, constraints on inputs, constraints on outputs, or the like. After the CSP is defined, a CSP solver may be applied. In some exemplary embodiments, based on the constraints, and on the functional block, a CSP solver may determine a solution to the CSP, e.g., a concrete solution that satisfies all the constraints. The solution may indicate an implementation for the functional block. In some exemplary embodiments, the solution may not be the only valid solution and may be selected based on the optimization criteria, such as attempting to minimize or maximize a target optimization function. Based on such solution, a quantum program can be created, compiled and executed on a quantum computer.

In some exemplary embodiments, the functional-level processing component may select an implementation of a functional block from a directory of different implementations for functions (referred to as 'function library'), storing viable implementations for multiple functions, performance parameters thereof, or the like. It is noted that given a target hardware, the function library may comprise two or more alternative valid implementations of a function for the target hardware. In such cases, there are two or more implementations from which a selection may be made, such as based on optimization considerations, and not solely based on feasibility. In some exemplary embodiments, the functional-level processing component may select an implementation of a functional block based on properties of alternative implementations in a function library, e.g., a number of cycles of the alternative implementation, a number of qubits utilized by the alternative implementation, an entanglement caused by the alternative implementation, a number of auxiliary qubits utilized by the alternative implementation, a number of auxiliary qubits cleaned by the alternative implementation, a cycle in which an auxiliary qubit utilized by the alternative implementation is released, a computational cost of performing cleanup of the auxiliary qubit utilized by the alternative implementation, a hardware or precision error rate of the alternative implementation, or the like. In some exemplary embodiments, one or more of the properties may be determined using a pre-processing operation performed irrespective to the functional-level representation of the quantum circuit, such as performed in advance when creating the function library. In some exemplary embodiments, the function library may be used for many different quantum circuits based on the initial pre-processing. In some exemplary embodiments, the pre-processing operation may be performed using quantum computing, using classic computing, or the like. Additionally, or alternatively, the pre-processing operation may take a considerable amount of time which may not be available or considered reasonable when compiling a quantum circuit. For example, while compilation may take a few seconds or even a few minutes, the pre-processing may take considerably longer, such as, for example, at least 30 minutes, 60 minutes, 2 hours, a day, three days, or the like.

In some exemplary embodiments, the functional-level processing component may select an implementation of the functional block that minimizes an overall cost of the properties, that minimizes one or more costs of properties, that complies with one or more constraints, or the like. It is noted that the term "cost" may relate to any cost function and not necessarily to monetary costs, such as for example, computation cost, memory cost, resource cost, time cost, or the like. Additionally, or alternatively, the cost function may be utilized as the target optimization function, whereby an optimized solution minimizes the cost as defined by the cost function. For example, a first implementation of a functional block may comprise properties including a first depth (e.g., number of cycles) and a first number of qubits, while a second implementation of the functional block may comprise properties including a second depth and a second number of qubits. In some cases, the first depth may be larger than the second depth, and the first number of qubits may be smaller than the second number of qubits. In case user constraints define that a number of utilized qubits is to be minimized, the first implementation may be selected. In case user constraints define that a depth is to be minimized, the second implementation may be selected.

In some exemplary embodiments, the functional-level processing component may select an implementation of a functional block from a table, a function library, or the like. In some exemplary embodiments, the functional-level processing component may select an implementation for a functional block from a function library. In some exemplary embodiments, for known functions, gate-level implementations may be created and stored within a function library. In some exemplary embodiments, the function library may retain a plurality of alternative gate-level implementations for one or more defined functional blocks. In some exemplary embodiments, each alternative implementation of a functional block may be configured to provide a same functionality of the functional block. In some exemplary embodiments, each alternative implementation of a functional block may match the underlying hardware and be operable therewith, thereby providing an implementation that is applicable to a quantum computer that is attempted to be used for executing the quantum circuit. In some exemplary embodiments, at least two different implementations may be applicable to the underlying hardware, and a selection therebetween may be required to be performed based on their properties and not solely based on feasibility of usage of the implantations for the underlying hardware.

In some exemplary embodiments, instead of selecting an implementation, or in addition thereto, the functional-level processing component may dynamically generate a gate-level implementation of a functional block according to determined resources, cost functions, or the like. For example, the functional-level processing component may determine that an optimal configuration for a functional block includes utilizing 10 qubits for 30 cycles. In case such an implementation is not found within the function library, the functional-level processing component may generate a gate-level instance that utilizes 10 qubits for 30 cycles. As another example, a software component may be designed to dynamically create an instance for a specific functional block based on a predetermined criteria, such as desired properties. In some exemplary embodiments, the functional-level processing component may select properties of a target implementation based on a tradeoff between resources such as an accuracy rate, an error rate, number of cycles and number of qubits, and dynamically generate a gate-level instance according to the determined properties.

In some exemplary embodiments, after completing the inline process, all functional blocks of the DAG may be replaced with inlined implementation blocks. In some exemplary embodiments, one or more different implementations may be selected, in some cases, to instances of a same functional block. For example, the functional-level representation of the quantum circuit may comprise two instances of a same functional block (e.g., the 'add' function), and the functional-level processing component may determine for each instance a different alternative implementation (such as by selecting different implementations from the function library, dynamically generating different implementations, or the like). The different alternative implementations may be determined so as to adhere to an optimization criterion for the quantum circuit and in view of the constraints on the quantum circuit.

In some exemplary embodiments, the functional-level processing component may utilize one or more resource constraint schedulers, CSP solvers, or the like, to determine a best manner of combining the inlined implementation blocks, a best resource allocation to the inlined implementation blocks, or the like, in view of a target function being optimized (e.g., utility function, cost function, or the like). In some exemplary embodiments, the functional-level processing component may process the functional level representation of the program, along with associated constraints, in order to determine optimizations that cannot be determined without having access to the functional level representation of the program.

In some exemplary embodiments, a gate-level representation of the quantum circuit may be generated to include the inlined implementation blocks, along with one or more schedules, optimization schemes, or the like. In some exemplary embodiments, the gate-level representation of the quantum circuit may comprise, for each functional block of the functional-level representation, a gate-level implementation for the functional block. In some exemplary embodiments, in contrast to the functional-level representation, the gate-level representation may no longer have functions, but rather qubits on gates. In some exemplary embodiments, the gate-level representation may be devoid of any block that defines a function over more than a single cycle. In some exemplary embodiments, the gate-level representation of the quantum circuit may comprise a set of qubits and a set of gates, in which each gate of the set of gates defines operations on the set of qubits or portion thereof by the quantum circuit at a different cycle.

In some exemplary embodiments, the gate-level representation of the quantum circuit may be provided to a gate-level processing component, which may be configured to generate a logical quantum program according to the inlined graph. In some exemplary embodiments, the gate-level processing component may process the gate-level representation of the quantum circuit and determine, for each inlined implementation block, a position of the block within the quantum program, connections between the blocks, allocated qubits, cleaning processes of qubits, or the like. In some exemplary embodiments, since the inlined DAG may not define an absolute order between the blocks, and may have parallel states, multiple orders and positions of an implementation block may be feasible. For example, in the above pseudo code example, the first two add functions have no order constraints and can be placed in parallel to each other, one after the other, or the like, as may be determined by the gate-level processing component.

In some exemplary embodiments, the logical quantum program may be provided to a hardware compiler. In some exemplary embodiments, the hardware compiler may convert the logical quantum program, in its gate-level representation, to a specific hardware implementation using gates and qubits. In some exemplary embodiments, each hardware compiler may be specifically tailored to a certain quantum computer, computer type, quantum hardware, or the like.

In some exemplary embodiments, the hardware compiler may obtain the logical program, a low-level IR thereof, or the like, and implement based thereon a physical program, by allocating physical qubits for respective logical qubits, allocating physical gates for the logical gates, or the like. In some exemplary embodiments, the hardware compiler may compile the logical program circuit and synthesize a corresponding executable circuit for the quantum computer. In some exemplary embodiments, compiling the logical program circuit may include performing optimizations such as a connectivity independent optimization on the gate-level representation of the quantum circuit, a hardware connectivity optimization on the gate-level representation of the quantum circuit, or the like. In some exemplary embodiments, compiling the logical program circuit may include assigning physical qubits in the quantum computer to the logical set of qubits defined in the gate-level representation of the quantum circuit, assigning physical gates to the logical gates defined in the gate-level representation of the quantum circuit, or the like.

In some exemplary embodiments, the executable circuit may be executed using the quantum computer. In some exemplary embodiments, in some cases, certain modifications may be performed, such as according to the hardware properties. For example, the hardware compiler may modify the logical program to comply with the underlying hardware constraints, available resources, or the like. In some exemplary embodiments, the resulting quantum circuit may be executed on the underlying quantum hardware or simulator. In some exemplary embodiments, a quality of the resulting executable quantum circuit may be evaluated using one or more evaluation tools, which may be associated to the quantum hardware.

In some exemplary embodiments, the hardware compiler may be made aware of functional-level information. In some exemplary embodiments, the functional-level processing component may provision the hardware compiler with information enabling the compiler to identify a gate-level implementation of a functional block. In some exemplary embodiments, the compiler may replace the selected implementation by an alternative implementation. Additionally, or alternatively, the compiler may utilize properties of the functional block or of the implementation in its analysis. As an example, entanglement properties may be hard to compute during compilation. However, pre-processed information may be made available providing hints to the compiler regarding entanglement between qubits in a certain implementation. Additionally, or alternatively, the compiler may compute assets useful for its operation. The computed assets may be provided to be retained for future use of the compiler when the compiler encounters the same function block, same implementation, or the like.

In some exemplary embodiments, some analysis by the hardware compiler may affect the quantum circuit significantly, potentially causing the optimized solution provided by the functional-level processing component to be non-optimized. In some exemplary embodiments, the hardware compiler may invoke the functional-level processing component and cause such component to re-generate the gate-level representation, while potentially modifying the circuit in view of the manipulations by the hardware component.

One technical effect obtained by the disclosed subject matter is providing a functional level processing component that enhances a performance of a quantum circuit. In some exemplary embodiments, the functional level processing component may be used as a translator that obtains function descriptions, and processes them to determine a gate-level representation of choice. In some exemplary embodiments, the functional level processing component may be used as an optimizer, which may predict resource utilizations and attempt to reduce them. In some exemplary embodiments, processing data at the function level may be computationally efficient, as a large corpus of data may be available regarding the functional blocks at the functional level.

Another technical effect obtained by the disclosed subject matter is enabling a programmer to program in a high-level programming language with an improved user experience (UX), while maintaining control of a resource consumption of the hardware compiler, e.g., via the user constraints. In some exemplary embodiments, the user may set values for the user constraints in a direct manner as part of the programming of the software. In some exemplary embodiments, using high-level programming language may save time for programmers, since high-level programming languages may have a user interface that is more user friendly, have a greater ease of use, may be less time consuming for the programmer, require less expertise, or the like. In some exemplary embodiments, the functional level processing component may enable users to define target constraints or limitations, and process the program accordingly.

Yet another technical effect obtained by the disclosed subject matter is providing a functional level processing component that determines a gate-level representation of choice according to hardware constraints and user preferences. In some exemplary embodiments, by taking into account the constraints, and utilizing one or more schedulers, CSP solvers, or the like, the functional level processing component generates a gate-level representation of a circuit that yields a better throughput and higher fidelity output, compared to performing a direct translation from the high level IR to the gate-level representation. In some exemplary embodiments, in contrast to IR programs that are hardware agnostic, the current subject matter enables to compile a gate-level representation that takes the hardware into account, e.g., the number of available qubits, type of hardware, connectivity status of the qubits, or the like.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1, showing an environment for processing and implementing quantum programs.

In some exemplary embodiments, Environment 100 may comprise a Functional Aware Programming Environment 110. In some exemplary embodiments, Functional Aware Programming Environment 110 may comprise a programming environment that supports one or more high level programming languages for programming a quantum program, in an abstract form that does not necessarily refer to a qubit set, a gate set, or the like. Functional Aware Programming Environment 110 may utilize libraries with functions, variable types, or the like, e.g., QCL™ libraries.

In some exemplary embodiments, using Functional Aware Programming Environment 110, a programmer may program a quantum program. In some exemplary embodiments, the quantum program may specify high level functions, low level components such as gates, or the like. In some exemplary embodiments, the program programmed by the programmer may comprise at least one function which defines functionality that is implementable over two or more qubits, using two or more gates, on two or more cycles, or the like.

In some exemplary embodiments, Environment 100 may comprise a High Level Intermediate Representation (IR) Translator 120, which may comprise a front end processing component. In some exemplary embodiments, a quantum program created at Functional Aware Programming Environment 110 may be provided to High Level IR Translator 120, for further processing. In some exemplary embodiments, High Level IR Translator 120 may be configured to translate the quantum program to a high level IR representation, including a language-independent intermediate representation of the program's code. In some exemplary embodiments, High Level IR Translator 120 may translate the quantum program from any programming language to a high level intermediate representation. In some exemplary embodiments, the high level IR may represent the functions in the high level programming language. As an example, the high level IR may comprise functions or function blocks, representing functionality spanning over two or more qubits, two or more cycles, two or more gates, or the like. In some exemplary embodiments, translating the program to the high level IR may not be computationally consuming. In some exemplary embodiments, High Level IR Translator 120 may be hardware agnostic, as it may not specify a quantum instruction or gate set.

In some exemplary embodiments, Environment 100 may comprise a Functional Level Processing Component 130, which may be hardware-aware and functional-aware. In some exemplary embodiments, Functional Level Processing Component 130 may obtain the IR functional-level representation of the quantum program from High Level IR Translator 120, and obtain hardware constraints, user preferences, or the like. Functional Level Processing Component 130 may process the functional-level representation, and perform one or more optimizations thereto. In some exemplary embodiments, Functional Level Processing Component 130 may be configured to determine a gate-level implementation for the high level program based on optimizations that are determined using a functional understating of the written functions, hardware data, user constraints, or the like. In some exemplary embodiments, Functional Level Processing Component 130 may operate software tools on the program, while taking into account hardware information and optimization information.

In some exemplary embodiments, Functional Level Processing Component 130 may generate a mapping, such as a DAG, according to the functions and temporal constraints of the functional level representation of the program. In some exemplary embodiments, in the generated DAG, each node may represent a functional block that corresponds to a function of the quantum program, and the edges may indicate temporal constraints on the functional blocks, e.g., a precedence order between functional blocks. In case a first function relies on an output of a second function, the first function may be required to be implemented only after the second function is implemented. For example, a functional-level program may include a first function, denoted X1=F1 (A), a second function, denoted X2=F2 (B), and a third function, denoted X3=F3 (X1,X2). According to this example, the third function depends on the output qubits of the first and second functions, X1 and X2, and therefore must be positioned after the first two functions. It is noted, however, that there is no temporal constraint between X1 and X2, as they can be implemented simultaneously, one after the other, or the like, as long as they are both implemented before X3.

In some exemplary embodiments, Functional Level Processing Component 130 may perform an inline process, in which each functional block is translated to a gate-level implementation. In some exemplary embodiments, each function may have multiple instances that implement the function. In some exemplary embodiments, each instance may have different properties, such as a number of inputs, outputs, and auxiliary qubits, a number of auxiliary qubits that are released, a time or cycle number of the release, a number of cycles, error related data on the quality of results error, a ratio between qubits and cycles, or the like.

In some exemplary embodiments, for each functional block, multiple interchangeable implementations or instances may be available, possible, or the like. In some exemplary embodiments, instances of a functional block may provide different ways of achieving the same, or similar, outcome. In some exemplary embodiments, multiple instances or implementations for a single functional block may be possible for a single functional block, such as by adjusting a number of qubits, adjusting a number of cycles, or the like.

In some exemplary embodiments, instances for a functional block may be selected from a programmable function instance library, such as the function library. In some exemplary embodiments, instances for a functional block may be generated dynamically, based on selected configurations of qubits and cycles. In some exemplary embodiments, instances may be dynamically generated in compilation time, based on defined properties, local optimization criteria, or the like. In some exemplary embodiments, the local optimization criteria may be different between different programs, between different instances of the same function in a program, or the like.

In some exemplary embodiments, Functional Level Processing Component 130 may select an implementation for each functional block from among the potential options. In some exemplary embodiments, each functional block may have multiple gate-level implementation options, from which the high-level processing component may choose. In some exemplary embodiments, Functional Level Processing Component 130 may determine a CSP problem with constraints in order to select an implementation of a functional block. Any other optimization or scheduling method may be used instead of using a CSP problem, or in addition thereto, or the like, such as by using a metaheuristic search. In some exemplary embodiments, the CSP solver may be configured to minimize objective functions such as a number of cycles, a number of two-qubit gates, an error rate, a number of utilized qubits, a number of defined gate types, a combination thereof, or the like, while complying with constraints. In some exemplary embodiments, constrains of the CSP may include user constrains such as a desired qubit/cycle ratio, in addition to constraints of the program itself, a DAG representation of the program, a high level IR representation of the program, or the like. In some exemplary embodiments, other constraints may include an auxiliary pool constraint, indicating a minimal number of auxiliary qubits that is required for the functional block. In some exemplary embodiments, other constraints may include a cost of uncompute (cleaning a dirty auxiliary qubit) for relevant qubits (and which qubits are clean as the clean operation may clean more than one qubit), hardware constraints, constraints on placing an instance in a quantum circuit, or the like. In some exemplary embodiments, clean qubits may refer to qubits that are unentangled and are not used by another part of the computation, while dirty qubits may refer to qubits whose state is unknown and can even be entangled with other parts of the quantum processor's memory. In some exemplary embodiments, Functional Level Processing Component 130 may solve the CSP problem using a CSP solver, or any other solver, thereby obtaining a selection of an instance for the functional block.

In some exemplary embodiments, Functional Level Processing Component 130 may select an implementation for a functional block based on one or more hard and soft requirements. For example, a functional block may be implemented in a manner that complies with hard requirements, such as a maximum availability of hardware qubits (e.g., less than 140 qubits), and that complies with one or more adjustable soft requirements, e.g., using the CSP. In some exemplary embodiments, soft requirements may comprise optimization requirements of gate-level properties, such as a desired number of qubits, cycles, gates, gates of a specific type, auxiliary qubits, a number of auxiliary qubits that are released, or the like. For example, a total cost of a program may be defined as a function of gate-level properties, and an optimization method may be configured to minimize the total cost by selecting an optimized gate-level configuration.

In some exemplary embodiments, Functional Level Processing Component 130 may select implementations for multiple functional blocks based on a global optimization of the entire circuit. In some exemplary embodiments, Functional Level Processing Component 130 may generate a global method of optimization for a quantum program, from local alternative implementations of functional blocks. In some exemplary embodiments, Functional Level Processing Component 130 may select implementations for functional blocks based on an estimated or predicted effect of the selections on the entire program (including all the selected implementations of the functional blocks). In some exemplary embodiments, for N functional blocks with two or more implementations, an N vector may represent for each functional block, the potential implementations. In some exemplary embodiments, the N vector may be analyzed to determine a result vector, which may represent a selection of implementations that provides a globally desired result. In some exemplary embodiments, the result vector of the N vector may comprise a number of the selected instance for each function, e.g., a result vector of (1,4,3,1,1,6) indicating that a first potential instance was selected for the first functional block, a fourth potential instance for the second functional block, and so on. In some exemplary embodiments, an evaluator may be used to calculate a value such as an optimization score of the result vector, which can be used to compare result vectors. For example, a result vector of (1,4,3,1,1,6) may be compared to a result vector of (1,2,1, 3,3,2), by generating for each result vector an optimization score, and comparing the scores, to identify which result vector obtains a higher score. For example, the score may be based on resource utilization.

In some exemplary embodiments, Functional Level Processing Component 130 may determine the result vector by analyzing the vector space using one or more search methods such as genetic search, genetic algorithms, a fitness function, particle swarm optimization functions, simulated annealing, or any other kind of search or algorithm in the space. In some exemplary embodiments, the result vector may be used to generate an optimized quantum program that includes an optimized selection of implementations for each functional block, according to the result vector.

In some exemplary embodiments, in some cases, Functional Level Processing Component 130 may select a different instance for a same functional block appearing twice in a program. For example, in the first appearance of the functional block, an instance with less qubits may be selected, and in the second appearance of the functional block, an instance with more qubits and less cycles may be selected, e.g., based on hardware constraints. In some exemplary embodiments, Functional Level Processing Component 130 may determine an optimized choice of instances for a specific program also for parameterized functions.

In some exemplary embodiments, Functional Level Processing Component 130 may select implementations for multiple functional blocks such as by generating a single CSP problem for all of the selections of block implementations. In some exemplary embodiments, the CSP problem may be generated based on multiple constraints, optimization goals, or the like. In some exemplary embodiments, the constraints may comprise constraints associated with each functional block, hardware constraints associated with the underlying quantum computer or simulator, or the like. In some exemplary embodiments, the optimization goals may comprise a desired execution time, a desired quality of outcome (e.g., a level of preciseness), or the like. In some exemplary embodiments, Functional Level Processing Component 130 may generate a CSP problem based on the constraints and goals, and solve the CSP problem using a CSP solver, thereby obtaining a selection of implementations for each functional block, that provide a global optimization. It is noted that while the optimization is global in the sense that it attempts to optimize the entire quantum circuit and not just a local single function, the solution provided using a CSP solver may be a local best solution, and not necessarily the best solution available.

In some exemplary embodiments, Functional Level Processing Component 130 may communicate or access an evaluator of a quantum program configured to evaluate parameters of the quantum program, and determine a global optimization score of the quantum program that can be used to compare it to other quantum programs, to determine a success or failure of Functional Level Processing Component 130, or the like.

In some exemplary embodiments, the global optimization itself may have a cost, and a diminishing return, e.g., since quantum programs may be executed a large number of times, so it may be advantageous to determine a best solution given the resources spent for the optimization, as opposed to spending any amount of resources until obtaining the optimized implementation selection. For example, in case a program is executed 5000 times, the total cost of the program may be determined to include the optimization cost, in addition to the runtime of the result for each execution (runtime of result*5000), and this cost may be further optimized by Functional Level Processing Component 130. In some exemplary embodiments, the optimization cost may be determined on a classic non-quantum computer, on a quantum computer, or the like.

In some exemplary embodiments, after obtaining a selection of implementations for each functional block, or determining dynamically-generated implementations, Functional Level Processing Component 130 may determine one or more optimizations for a logical program including the implementations, such as scheduling optimizations, qubit allocation optimizations, or the like. Additionally, or alternatively, Functional Level Processing Component 130 may provide the resulting implementations to Gate Level Processing Component 140, and Gate Level Processing Component 140 may determine the optimizations.

In some exemplary embodiments, the CSP solver may provide scheduling optimizations, in addition to or instead of a selection of instances, such as a selection of a timeframe for each block, a selection of connectivity levels for allocated qubits, or the like, e.g., which may be provided to Gate Level Processing Component 140. In some exemplary embodiments, such results may be obtained by generating a CSP problem with additional determined constraints, such as a total number of qubits that can be used in parallel, cost functions of gates, objective functions, uncompute costs, uncompute scheduling, or the like. Alternatively, one or more schedulers may be used to determine the scheduling data.

In some exemplary embodiments, as part of determining the one or more optimizations, Functional Level Processing Component 130 may obtain a scheduler, that, for given implementation of each function above, constraints and optimization goals, creates a relatively optimized quantum program. In some exemplary embodiments, Functional Level Processing Component 130 may utilize the scheduler to determine a logical quantum program that can be compiled by Hardware Aware Compiler 150. For example, the scheduler may determine whether a qubit output of a first functional block is estimated to have an equal state as a qubit input of a second functional block, and can use the same qubit. In case it can, and such scheduling complies with defined constraints, the first functional block may be scheduled before the second functional block.

In some exemplary embodiments, as part of determining the one or more optimizations, Functional Level Processing Component 130 may estimate whether some of the qubits used by a function block can be borrowed from a different functional block, instance, or the like. In some exemplary embodiments, a borrowed qubit may include a dirty qubit that can be temporarily used in condition that it is returned in its original state. Some quantum algorithms are capable of using qubits without relying on their exact state, e.g., even if they are unentangled with the rest of the system. Such algorithms may be able to ensure that the borrowed qubits are returned exactly to their original state independent of which state that was. In some exemplary embodiments, borrowing dirty qubits instead of allocating designated qubits may reduce the overall quantum memory requirements and thereby decrease a utilization of qubit resources, at the expense of cleaning or returning the state of the borrowed qubit. In some exemplary embodiments, functional blocks may require clean qubits, which may be cleaned using an uncompute operation, e.g., in case a clean qubit is not available, or a specific qubit is more desirable due to connectivity concerns. In some exemplary embodiments, Functional Level Processing Component 130 may determine uncompute information, such as potential costs of uncomputing a qubit, a number of uncompute processes, or the like, and allocate dirty qubits for cleaning operations based thereon.

In some exemplary embodiments, as part of determining the one or more optimizations, Functional Level Processing Component 130 may determine one or more manners of using dirty qubits without cleaning them. In some exemplary embodiments, as uncompute may be a computationally expensive operation, it may be advantageous to replace such operations with operations that utilize less computational resources. In some exemplary embodiments, in case a same input is used twice for two different functional blocks, the functions may be set to be positioned after each other, so as to use the same qubit twice. Another alternative operation may include providing to the hardware compiler the actual states of the qubits, to enable to compiler to adjust a state of a qubit to a target state, without cleaning the qubit.

In some exemplary embodiments, as part of determining the one or more optimizations, Functional Level Processing Component 130 may determine an allocation of additional qubits, e.g., based on a qubit pool. In some exemplary embodiments, a determined schedule of the program may be analyzed, in order to detect a qubit pool with additional qubits that are released, dirty, have usage constraints, or the like, and may be used to enhance an execution of a functional block. In some exemplary embodiments, the qubit pool may be determined to include qubit states, qubit positions or roles, released auxiliary pools, unreleased auxiliary qubits that can be released with a determined cost of release, areas in the program that are idle and can be used in their dirty state, or the like. In some exemplary embodiments, Functional Level Processing Component 130 may detect the additional qubits by analyzing the program, by obtaining an indication of Hardware Aware Compiler 150 indicating that a previous version of the program was implemented with less resources than allocated in the logical program, or the like.

In some exemplary embodiments, as part of determining the one or more optimizations, Functional Level Processing Component 130 may determine a target distance between logical qubits, e.g., based on mapping information relating to a connectivity status between each two hardware qubits of the designated hardware platform, which may influence a performance of the quantum circuit. For example, in case two physical qubits are physically connected, it may be advantageous to allocate thereto logical qubits that participate in multiple gates together.

In some exemplary embodiments, as part of determining the one or more optimizations, Functional Level Processing Component 130 may determine one or more artifacts, attributes, properties, or the like, that are associated with an instance of a functional block, and are estimated to be useful to downstream components such as Hardware Aware Compiler 150. Functional Level Processing Component 130 may store and maintain such artifacts in a library that is accessible to Hardware Aware Compiler 150, provide them directly to Hardware Aware Compiler 150 or Gate Level Processing Component 140, or the like. In some exemplary embodiments, in contrast to downstream components, which may not have access to functional-level data, Functional Level Processing Component 130 may have access to various functional data including a length of functions with a known length, a minimal number of cycles for a function, a number of utilized qubits for a function, an identity of the input qubits, an identity of the output qubits, whether auxiliary qubits are configured to be uncomputed, how many auxiliary qubits are used, a cost of cleaning dirty auxiliary qubits, or the like. In some exemplary embodiments, the artifact may include hardware data that is not available to Gate Level Processing Component 140, such as a number of physical qubits, available gate types, or the like. Providing such data to a downstream component may enable to process the gate-level representation of the program, or compile the program, with enhanced performance. In some exemplary embodiments, a downstream component may send an artifact with a re-usable value to Functional Level Processing Component 130, such as so that Functional Level Processing Component 130 will add the artifact in its library, and provide it to the downstream component upon processing the associated instance in the future. In some exemplary embodiments, examples of artifacts may include a logical data precedence graph, a priority table, a closeness matrix, entanglement properties, gate level implementation, or the like.

In some exemplary embodiments, Environment 100 may comprise a Gate Level Processing Component 140. In some exemplary embodiments, Gate Level Processing Component 140 may obtain from Functional Level Processing Component 130 a gate-level representation of the functional blocks ('inlined blocks'), as well as one or more additional schedules, allocations, instructions, metadata, or the like. In some exemplary embodiments, Gate Level Processing Component 140 may create a logical program by scheduling each inlined block within the logical program, allocating qubits and cycles for each gate, connecting qubits from some inlined blocks to other inlined blocks, or the like. In some exemplary embodiments, Gate Level Processing Component 140 may be enabled to query Functional Level Processing Component 130 for functional level data, such as to determine a role of a qubit.

In some exemplary embodiments, Environment 100 may comprise a Hardware Aware Compiler 150 and a Quantum Hardware 160. In some exemplary embodiments, Hardware Aware Compiler 150 may obtain the logical program from Gate Level Processing Component 140, or a low level IR thereof, and compile the program into a machine representation. In some exemplary embodiments, Hardware Aware Compiler 150 may be specifically tailored to match Quantum Hardware 160, e.g., to implement the program using available hardware gates, qubits, or the like, based on hardware constraints of Quantum Hardware 160. In some exemplary embodiments, Hardware Aware Compiler 150 may allocate hardware qubits to abstract logical qubits, hardware gates to logical gates, or the like. In some exemplary embodiments, each abstract qubit may be allocated a physical concrete qubit from the auxiliary poor, such as qubit number 124 in Quantum Hardware 160, or any other qubit identifier.

One technical problem dealt with by the disclosed subject matter is to select an implementation of a functional block according to an optimization criteria. For example, it may be desired to select an implementation that enhances a performance of the functional block within the circuit, as measured using the optimization criteria. In some exemplary embodiments, a functional-level representation of a quantum circuit may comprise functional blocks representing respective functions. In some exemplary embodiments, for each functional block, there may exist more than one viable implementation option for the relevant hardware. It may be desired to select an implementation that complies with one or more constraints, performance parameters, objective functions, or the like.

Another technical problem dealt with by the disclosed subject matter is selecting an implementation of the functional block from a function library. In some exemplary embodiments, for known functions, gate-level implementations may be created, such as during a pre-processing stage, and stored within a function library. In some exemplary embodiments, the function library may retain a plurality of alternative gate-level implementations for one or more defined functional blocks. In some exemplary embodiments, each alternative implementation of a functional block may be configured to provide a same, or similar, functionality of the functional block. For example, the function library may store, for a functional block, a first set of implementations that complies with a first type of hardware and a second set of implementations that complies with a second type of hardware.

In some exemplary embodiments, each alternative implementation of the functional block may be referred to as an instance. In some exemplary embodiments, multiple instances may be available for a single functional block. In some exemplary embodiments, different instances may have different properties, such as a different utilization of qubits, cycles, error rates, entanglements, released auxiliary qubits, or the like, which may affect the overall performance of the circuit.

Figure 2A:
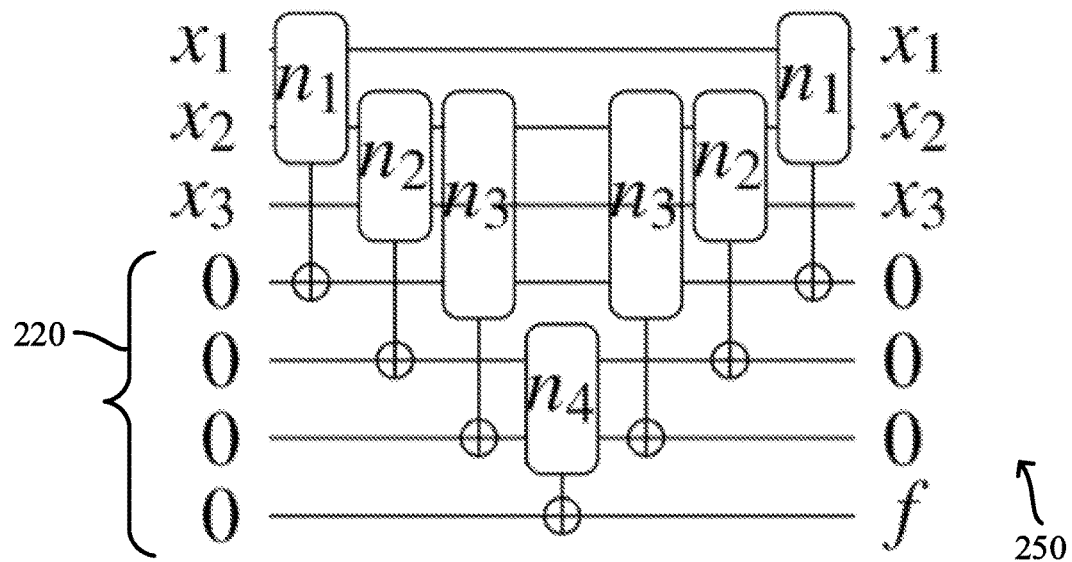
FIGS. 2A-2B show exemplary implementations of a functional block, in accordance with some exemplary embodiments of the disclosed subject matter.
Figure 2B:
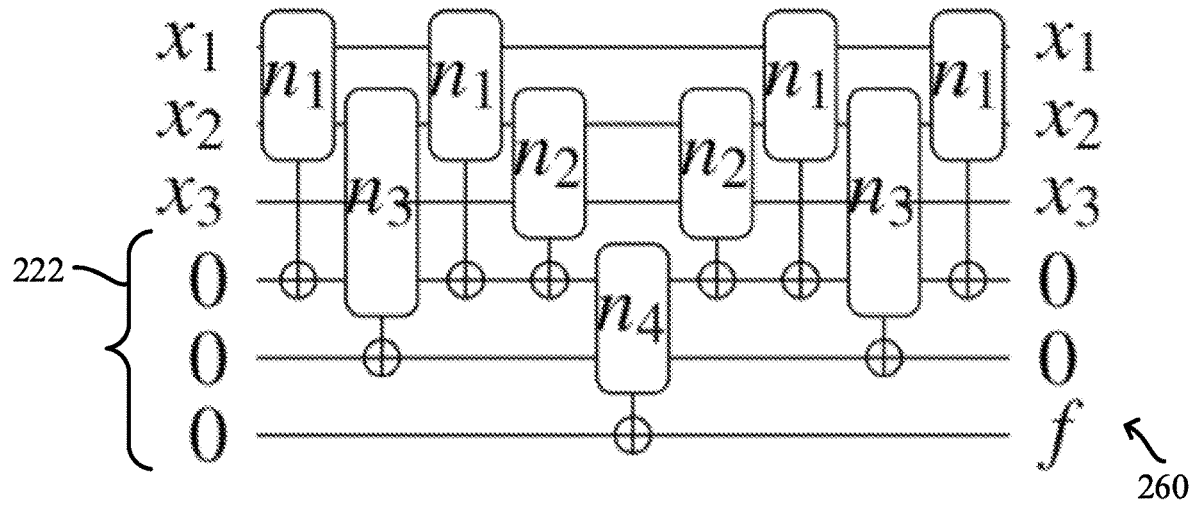

Referring now to FIGS. 2A-2B, depicting different implementations of a same functional block, function, or the like.

As illustrated in FIG. 2A, an Implementation 250 of the function may utilize four Auxiliary Qubits 220, and eight cycles.

As illustrated in FIG. 2B, a different Implementation 260 of the same function as FIG. 2A, may utilize three Auxiliary Qubits 222, and nine cycles. As can be appreciated, a tradeoff may exist between the number of qubits and the number of cycles.

In some exemplary embodiments, in addition to Implementations 250 and 260, many other implementations with different properties may be possible. In some exemplary embodiments, each implementation may offer a different tradeoff between different properties of the circuit, such as a number of utilized qubits, a number and types of utilized gates, a number of utilized cycles, an execution time, a precision or accuracy of the result, a quality of the result, or the like.

One technical solution provided by the disclosed subject matter may include selecting, for a quantum program with multiple functions, an implementation from available implementations for each function according to one or more local optimization criteria. In some exemplary embodiments, for each functional block, a best instance may be selected based on local optimization criteria and compliance with constraints.

In some exemplary embodiments, a functional-level representation of a quantum circuit may be obtained, e.g., at a functional-level processing component such as Functional Level Processing Component 130 (FIG. 1). In some exemplary embodiments, the functional-level representation of the quantum circuit may comprise a first functional block within the quantum circuit, that defines an operation of the quantum circuit over at least two cycles, two qubits, two gates, or the like. In some exemplary embodiments, the first functional block may be implemented using at least two gates, at least two qubits, at least two cycles, or the like. In some exemplary embodiments, the functional-level representation of the quantum circuit may include a second functional block within the quantum circuit. In some exemplary embodiments, both the first and second functional blocks may be defined by the functional-level representation to co-operate with each other, such as via a functional-level interface. In some cases, in addition to the functional blocks representing a portion of the quantum circuit, the functional-level representation of the quantum circuit may comprise one or more gate-level representations of another portion of the quantum circuit.

In some exemplary embodiments, the functional-level processing component may select an implementation for a functional block, e.g., the first or second functional blocks, from a function library. In some exemplary embodiments, the function library may comprise a plurality of alternative implementations of the functional block. In some exemplary embodiments, each implementation of the plurality of alternative implementations may be configured to provide a same functionality of the functional block. In some exemplary embodiments, an implementation of a functional block may be selected based on various properties of each implementation, e.g., based on one or more optimization criteria. In some exemplary embodiments, an implementation of a functional block may be selected in case it is applicable to a quantum computer that is attempted to be used for executing the quantum circuit. In some exemplary embodiments, there may be at least two alternative implementations for the functional block that are applicable for the quantum computer that is to be used for executing the quantum circuit. It is noted that there may be alternative implementations that are applicable to different types of quantum computers, some of which may not be applicable to the quantum computer that is to be used for executed the quantum circuit. In some exemplary embodiments, each of the plurality of alternative implementations may have properties, and the selected implementation may be selected based on the properties.

In some exemplary embodiments, properties of the alternative implementations may include a number of cycles of the alternative implementation, a number of qubits utilized by the alternative implementation, an entanglement caused by the alternative implementation, a number of auxiliary qubits utilized by the alternative implementation, a number of auxiliary qubits cleaned by the alternative implementation, a cycle in which an auxiliary qubit utilized by the alternative implementation is released, a computational cost of performing cleanup of the auxiliary qubit utilized by the alternative implementation, an error rate of the alternative implementation, a precision of the alternative implementation, or the like. For example, properties of a first implementation of a functional block may include a first depth (e.g., number of cycles) and a first number of qubits, while properties of a second implementation of the same functional block may comprise a second depth and a second number of qubits. According to this example, although both implementations may provide corresponding or identical functionalities, qubits states, or the like, the first depth may be larger than the second depth, and the first number of qubits may be smaller than the second number of qubits.

In some exemplary embodiments, some of the properties of an implementation may be determined using a pre-processing operation, which may be performed irrespective to the functional-level representation of the quantum circuit, based on the functional-level representation of the quantum circuit, or the like. The pre-processing may be performed when compiling the function library and irrespective of a specific quantum circuit in which the implementations are used. For example, the properties of an implementation for a quantum function may be determined at a remote server, by the functional-level processing component, by an evaluator that is associated with quantum hardware, or the like. In some exemplary embodiments, the pre-processing operation may performed using quantum computing, classic computing, or the like. In some exemplary embodiments, the pre-processing may, in some cases, consume or require a relatively large period of time or computational resources, which may not be available when generating a specific circuit. For example, while compilation of the implementation may take a few seconds or even a few minutes, the pre-processing may take considerably longer, such as, for example, at least 30 minutes, 60 minutes, 2 hours, a day, three days, or the like. In some cases, after the pre-processing is completed, the properties of the implementation may be retained in a library such as the function library, in a database, in a repository, or the like, and may be available for use for any processing component that is configured to implement or process a functional-level program. The function library and the pre-processed computed properties may be re-used for different circuits, at different times, sites, computation platforms, or the like.

In some exemplary embodiments, the functional-level processing component may select an implementation for a functional block while taking into account hardware constraints such as a number of qubits in the hardware, a type of technology used by the hardware, a connectivity of the hardware qubits, or the like. In some exemplary embodiments, the functional-level processing component may select an implementation for a functional block while taking into account user constraints such as optimization criteria indicating a preferred result, a preferred execution time, a preferred precision, or the like. In some exemplary embodiments, the functional-level processing component may select an implementation for a functional block while taking into account functional-level constraints such as a required number of qubits, cycles, or the like. In some exemplary embodiments, hardware constraints may be considered 'hard' constraints that must be complied with by the selected instance, while the user constraints may be considered 'soft' constraints that are not obligatory. Additionally, or alternatively, the user may define both hard and soft constraints. In some exemplary embodiments, the functional-level processing component may evaluate, for a set of alternative instances of a function, whether or not they comply with the constraints, and select an implementation that complies with the hard constraints and enhances properties of the soft constraints.

In some exemplary embodiments, in some cases, the functional-level processing component may select a different implementation for multiple instances or appearances of a same functional block of the quantum circuit. In some cases, the functional-level representation of the quantum circuit may comprise two or more instances of the functional block, and the functional-level processing component may select a different or same implementation to each instance. In some exemplary embodiments, a different alternative implementation may be selected from the function library for two or more instances of the functional block. In some exemplary embodiments, the different implementations may be selected using different optimization criterions for each instance, e.g., a different desired speed, different available resources, or the like. In some exemplary embodiments, implementations for a function may be selected based on hard constraints that must be met by the quantum circuit, based on an optimization criterion regarding the quantum circuit, or the like. In some exemplary embodiments, optimization criteria may comprise a minimal number of qubits, a minimal number of cycles, a desired precision, or the like. In some exemplary embodiments, optimization criteria may vary for different programs, different functions in a program, or the like.

For example, the functional-level representation of the quantum circuit may utilize the function 'add' twice, each occurrence corresponding to a functional block of a DAG. The first 'add' function may be implemented with a first ratio of qubits to cycles, while the second 'add' function may be implemented with a second ratio of qubits to cycles, which may or may not include a different ratio, e.g., based on different optimization criterions. In some cases, the first and second 'add' functions may be implemented with different precision rates, different gates, different entanglement properties, or the like. As another example, a first instance of a function may be implemented in a period in which the hardware has extra available qubits, while a second instance of the function may be implemented in a period in which the hardware does not have extra available qubits, as it may be running in parallel with other functions. According to this example, optimization criteria for the first instance may focus on minimizing a number of cycles, while optimization criteria for the second instance may focus on minimizing a number of utilized qubits.

In some exemplary embodiments, the functional-level processing component may generate a gate-level representation of the quantum circuit to include a selected implementation for each functional block. In some exemplary embodiments, the gate-level representation of the quantum circuit may be generated to comprise a set of qubits and a set of gates. In some exemplary embodiments, each gate of the set of gates in the gate-level representation may define operations on the set of qubits or portion thereof by the quantum circuit at a different cycle. In contrast to the functional-level representation of the quantum circuit, the gate-level representation may be devoid of any block that defines a function over more than a single cycle.

In some exemplary embodiments, the gate-level representation of the quantum circuit may be compiled, to synthesize an executable circuit for the quantum computer. In some exemplary embodiments, compiling the quantum circuit may comprise performing a connectivity independent optimization on the gate-level representation of the quantum circuit, and performing a hardware connectivity optimization on the gate-level representation of the quantum circuit. In some exemplary embodiments, compiling the quantum circuit may comprise assigning physical qubits in the quantum computer to the set of qubits defined in the gate-level representation of the quantum circuit. In some exemplary embodiments, the executable circuit may be executed using the quantum computer.

One technical effect of utilizing the disclosed subject matter is to provide an optimization in a relatively higher abstraction level than that of a gate-level, potentially enabling to provide better optimizations than are available when working in a lower abstraction level. In some cases, the functional-level optimization may enable the optimization to relate to functionality of the entire circuit and avoid focusing on local optimizations in complicated and large quantum circuit, whose gate-level representation may be relatively large.

Another technical effect of utilizing the disclosed subject matter is to provide a selection of an implementation for a functional block in a hardware aware, functional-aware and user-aware manner.

Yet another technical effect of utilizing the disclosed subject matter is to select an implementation of a function that reduces the amount of resources, such as memory or time resources, that are utilized, while being equivalent to other implementations. In some exemplary embodiments, the implementation of a function may be selected according to optimization criteria.

Yet another technical effect of utilizing the disclosed subject matter is to re-use computational and time resources utilized for constructing a function library for different quantum circuits, enabling overall reduction of required resources to generate a plurality of quantum circuits over time.

Figure 3:
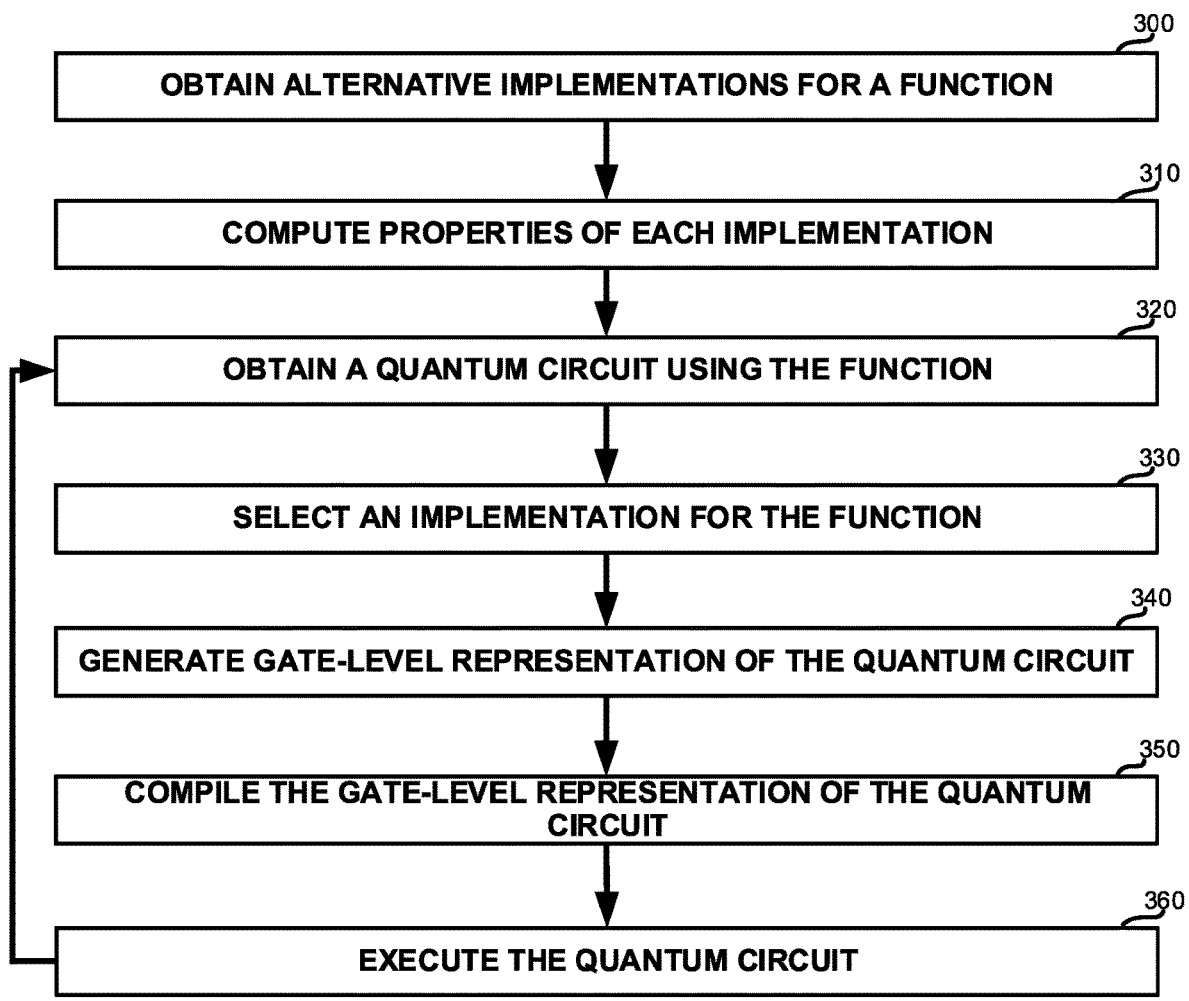
FIG. 3 shows a flowchart diagram of a method, in accordance with some exemplary embodiments of the disclosed subject matter.

Referring now to FIG. 3, showing a flowchart diagram of a method, in accordance with some exemplary embodiments of the disclosed subject matter.

On Steps 300-310, a library function may be created or updated. On Step 300, alternative implementations of a function may be obtained. Each implementation may be a different implementation of the function. Each implementation may be inlined instead of a functional block in a functional-level representation of a quantum circuit. In some exemplary embodiments, the implementation may be provided in gate-level representation, such as devoid of any functional blocks in of itself. Additionally, or alternatively, some implementations may be in a functional-level representation and may include functional blocks.

On Step 310, properties of each implementation may be determined. In some exemplary embodiments, the properties may be provided by a user in a manual fashion. Additionally, or alternatively, the properties may be determined automatically, such as based on an analysis of the implementation, based on simulated execution of the implementation, based on actual execution of the implementation, or the like. In some exemplary embodiments, the properties may be computed using a quantum computer. For example, a quantum computer may be utilized to execute the implementation to determine the entanglement properties such implementation has. Additionally, or alternatively, different properties may be determined for different quantum computer for the same implementation, such as in case the different hardware affects the properties.

As can be appreciated, the library is constructed before having a specific quantum circuit to be processed, offline, and at times where immediate response may not be required.

On Step 320, a functional-level representation of a quantum circuit that uses the function is obtained. In some exemplary embodiments, a function of the functional-level representation may be represented by a functional block of a DAG, or by any other manner.

On Step 330, an implementation of the function may be selected from the function library. In some exemplary embodiments, implementations of the function that do not comply with hard constraints such as hardware requirements of the quantum computer, may be filtered out, not selected, removed from a candidate list, discarded, or the like. For example, in case the quantum computer has 100 qubits, and an implementation of a function requires 140 qubits, the implementation may not comply with the hardware requirements, and may not be selected.

In some exemplary embodiments, the selection is made from the function library that was created in advance. The selection may be made between at least two applicable options that can be utilized for the quantum computer that is to be used to execute the quantum circuit. In some exemplary embodiments, after filtering out all implementations that are inapplicable to the quantum computer, at least two implementations may remain. The selection between the two implementation may be based on hard constraints, soft constraints, optimization criterion, or the like.

In some exemplary embodiments, implementations may be evaluated against one or more optimization criteria, e.g., in case they comply with the hard constraints. In some exemplary embodiments, an implementation from the remaining implementations may be selected based on optimization criteria, e.g., indicating a desired ratio between resource utilization, a desired minimization of a parameter, a desired maximization of a parameter, or the like. In some exemplary embodiments, in case the optimization criteria vary for different instances of a function, different implementations may be selected for each instance. In some exemplary embodiments, an overall circuit optimization may be performed, resulting in a selection of different implementations for the same function in two different function blocks within the function-level representation. For example, the function add may be utilized twice in the quantum circuit, and each time, a different implementation may be selected thereto, so as to provide an overall optimized circuit, with respect to an optimization criterion.

A gate-level representation of the quantum circuit may be generated (340). In some exemplary embodiments, the gate-level representation may be generated by inlining the selected implementation instead of the function block, appearing in the functional-level representation. Additionally, or alternatively, in case the implementation is in a function-level representation as well, the same step may be re-performed until the entire circuit is provided in a gate-level representation, without any functional blocks. The gate-level representation may be compiled (350) by a compiler, such as Hardware Aware Compiler 150 and the executable quantum circuit created by the compiler may then be executed (360) on the quantum computer, such as Quantum Hardware 160

One technical problem dealt with by the disclosed subject matter is to generate a gate-level representation of a quantum circuit based on a functional-level representation of the quantum circuit, while complying with multiple constraints. In some exemplary embodiments, a functional-level representation of a quantum circuit may comprise functional blocks representing respective functions. In some exemplary embodiments, the functional-level representation may be obtained from a programmer or high-level QIR translator, and may be written in a high level programming language with at least some library functions, library variables, or the like, that may or may not refer to specific resources such as qubits.

Another technical problem dealt with by the disclosed subject matter to generate a gate-level representation of a quantum circuit based on a functional-level representation of the quantum circuit, while performing global optimization of the process. In some exemplary embodiments, for each functional block, more than one viable implementation options for the relevant hardware may exist. It may be desired to select implementations for the functional blocks of a program, in a manner that provides a global optimization that takes into account an expected availability of resources at the target hardware, a resource consumption of each functional block, or the like.

Yet another technical problem dealt with by the disclosed subject matter is to determine gate-level implementations for functional blocks in the functional-level representation, in a manner that complies with global optimization criteria and with constraints such as hardware constraints, user constraints, or the like.

One technical solution provided by the disclosed subject matter may include determining or obtaining constraints for a quantum program, and generating therefrom a CSP problem that represents the problem of selecting implementations for the functional blocks of the program. In some exemplary embodiments, the generated CSP problem may be solved with a CSP solver, a heuristics-based solver, a theorem prover, a linear programming solver, or the like. In some exemplary embodiments, the solution to the CSP problem may indicate an optimal selection of implementations of functional blocks, their scheduling, their interconnecting wirings, or the like. In some exemplary embodiments, the resulting selection may comply with global constraints, local constraints, optimization criteria, or the like.

In some exemplary embodiments, instead of or in addition to using a CSP, a search for an optimal assignment vector may be utilized. The assignment vector may indicate for each functional block an assigned implementation. A search for the optimal assignments may be performed by traversing the different vectors in the vector space, using genetic algorithms, or the like.

In some exemplary embodiments, a gate-level representation of the quantum circuit may be synthesized based on the solution to the CSP. In some exemplary embodiments, the gate-level implementation of the functional block may comprise two gates, two qubits, or the like. In some exemplary embodiments, the gate-level representation comprises a set of qubits and a set of gates. In some exemplary embodiments, each gate of the set of gates may define operations on the set of qubits or portion thereof by the quantum circuit at a different cycle. In some exemplary embodiments, the gate-level representation may be devoid of any block that defines a function over more than a single cycle or that is implemented using more than a single gate. In some exemplary embodiments, the gate-level implementation may be compiled and executed on a quantum computer. Additionally, or alternatively, execution of the quantum program may be simulated using classic computer.

In some exemplary embodiments, a functional-level processing component may be provided. In some exemplary embodiments, the functional-level processing component may obtain a high level representation of the quantum circuit, including a functional-level representation of the quantum circuit. In some exemplary embodiments, the functional-level representation may comprise a high level program written with a high level programming language, a high level IR representation of the high level program that represents different programming languages in a standard functional-level format, or the like. In some exemplary embodiments, the functional-level representation (e.g., the IR representation) of the circuit may comprise at least one function, in addition to or instead of specifying qubits and other low level components. In some exemplary embodiments, a function may define an operation of the quantum circuit over at least two cycles, two qubits, two gates, or the like.

In some exemplary embodiments, relative constraints between the functions, the gate-level elements, or the like, may be determined. In some exemplary embodiments, the constraints may be used to generate a DAG, or any other representation of the functional-level program that takes into account temporal constraints. In some exemplary embodiments, the DAG may be obtained, generated, or the like, based on the functional-level representation of the circuit. In some exemplary embodiments, the DAG may comprise a set of functional blocks and connections therebetween. In some exemplary embodiments, the functional-level processing component may generate a DAG in which each node may comprise a functional block that represents a function of the functional-level representation, and each edge represents temporal constraints such as a precedence relationship between nodes, an output-input relationship between the two connected functional blocks, e.g., defining that a value of a qubit outputted by a first block is used as an input value of a qubit of a second block, or the like. In some exemplary embodiments, the set of blocks of the DAG may comprise at least one functional block that defines an operation of the quantum circuit over at least two cycles, two qubits, two gates, or the like. In some exemplary embodiments, a connection between a first block and a second block may indicate passing an output value from an output qubit exiting the first block to an input qubit entering the second block. Additionally, or alternatively, a connection between a first block and a second block may indicate a reuse of an input value provided to the first block that is also used in the second block.

In some exemplary embodiments, functional blocks of the DAG may have multiple alternative instances or implementations to which they can be translated, which may comprise different ways of achieving the same outcome using different resource allocations, different processes, or the like. In some exemplary embodiments, a function may have multiple implementations, such as hand crafted, automatically generated by a program, or the like. In some exemplary embodiments, implementations for a function may be available in a function library (e.g., provided by a programming language kit), may be available by dynamically generating an implementation, or the like.

In some exemplary embodiments, it may be desired to obtain a selection of implementations, for each functional block, that optimizes the entire circuit with respect to a target optimization function (e.g., minimizing a cost function, maximizing a utility function, or the like), while complying with hardware constraints, user constraints, temporal constraints, or the like. In some exemplary embodiments, a local selection of an implementation for a functional block may infer one or more effects on other elements of the program, e.g., other functional blocks, gate-level elements, or the like. For example, selecting an implementation of a functional block that utilizes a large number of qubits may affect an implementation of a different functional block that is executed in parallel thereto, since the different functional block may have a low availability of qubits.

In some exemplary embodiments, a CSP may be determined based on the DAG. In some exemplary embodiments, based on the DAG, the functional-level program, the functional-level IR, hardware properties, optimization criterion, or the like, CSP constraints of the program may be determined. In some exemplary embodiments, the functional-level processing component may determine constraints of the DAG representing the functional-level description of the circuit, by modeling the DAG. In some exemplary embodiments, the CSP may define one or more constraints that may be determined based on the connections defined by the DAG. In some exemplary embodiments, hardware aware compiling of the high level program may be enabled by determining the CSP constraints, taking into account hardware properties, and enabling a CSP solver to select an implementation for each functional block from among the potential options. In some exemplary embodiments, by generating a single CSP problem for all of the selections of block implementations, the functional level processing component may enable to provide an enhanced selection of implementations for multiple functional blocks.

In some exemplary embodiments, the CSP problem may be generated based on multiple constraints, optimization goals, or the like. In some exemplary embodiments, the constraints may comprise constraints associated with each functional block, constraints associated with a temporal relationship between the functional blocks, hardware constraints associated with the underlying quantum computer or simulator, software constraints, or the like. In some exemplary embodiments, the optimization goals may be obtained from a user, an operator, a heuristics-based agent, an automation process, a software agent, or the like. In some exemplary embodiments, the CSP may comprise a constraint on a sub-group of blocks of the quantum circuit, on all the blocks of the quantum circuit, or the like.

In some exemplary embodiments, the CSP may be generated to include a constraint, e.g., a global constraint, on a number of qubits that are included in the target hardware for any number of functional block implementations. In some exemplary embodiments, the qubits of the quantum hardware may be utilized by parallel executions of functional blocks, as long as they do not use more qubits than available. For example, in case the hardware employs 50 qubits altogether, and two functional blocks are implemented in parallel, the sum of qubits used each cycle by the functional blocks cannot overpass 50.

In some exemplary embodiments, the CSP may define a constraint on a maximal hardware error rate of the entire quantum circuit, a maximal hardware error rate of an implementation of a functional block, or the like. In some exemplary embodiments, a hardware error rate may indicate a cumulative rate of error that increases for each additional gate that is used, and may be due to decoherence or other quantum noise. In some cases, different functional blocks may be defined with a different maximal hardware error rate, e.g., by a user selection, heuristics, an automation process, or the like. In some cases, different instances of a functional block may be defined with a different maximal hardware error rate. For example, a first instance of an 'add' function may be implemented with a first constraint on the hardware error rate, and a second instance of the 'add' function may be implemented with a second constraint on the hardware error rate, e.g., a greater threshold, a lesser threshold, or the like. In some exemplary embodiments, the CSP may be generated to include the hardware error rate constraints. In some exemplary embodiments, a global constraint on the hardware error rate of a specific output of the quantum circuit may be defined. Additionally, or alternatively, a global constraint on the hardware error rates of all outputs of the quantum circuit may be defined.

In some exemplary embodiments, the CSP may define a constraint on a maximal precision error of the entire quantum circuit, a maximal precision error of an implementation of a functional block, or the like. In some exemplary embodiments, a precision error may indicate a numeric precision of a determined value. In some cases, different functional blocks may be defined with a different maximal precision errors, e.g., by a user selection, heuristics, an automation process, or the like. In some cases, different instances of a functional block may be defined with a different maximal precision error. For example, a first instance of an 'add' function may be implemented with a first constraint on the precision error, and a second instance of the 'add' function may be implemented with a second constraint on the precision error, e.g., a greater threshold, a lesser threshold, or the like. In some exemplary embodiments, the CSP may be generated to include the obtained or determined precision error constraints. The precision error constraints may be defined globally, with respect to a specific qubit, with respect to a specific qubit at a specific cycle or at a specific timing (e.g., upon providing the qubit value to a functional block), or the like.

In some exemplary embodiments, the CSP may comprise a variable relating to a number of auxiliary qubits available in an auxiliary pool. In some exemplary embodiments, the CSP may model a qubit pool from which auxiliary and other qubits are selected to be utilized. The number of available qubits may be defined using a variable and utilized in the generation of a solution to the CSP, which utilizes the qubit pool in an optimal or near-optimal manner. Additionally, or alternatively, the CSP may comprise a variable indicating whether an available auxiliary qubit is clean or dirty. A clean qubit in the qubit pool may be utilized as is, while a dirty qubit may require to be cleaned, such as utilizing an uncompute processing, before being used. Such variable may be implemented in the CSP to enable an optimal utilization of clean qubits when possible and utilization of dirty qubits when useful. Additionally, or alternatively, the CSP may comprise a variable indicating an inter-block timing in which an auxiliary qubit is released. The variable may be utilized to model the timing from which the qubit can be utilized for other purposes. In some cases, a qubit that is released prior to the end of the functional block can be utilized by a processing performed in parallel to the remainder of the functional block. Additionally, or alternatively, the released qubit can be utilized in parallel to the functional block, after the qubit is released by the functional block but before the conclusion of the functional block.

In some exemplary embodiments, the optimization goals may comprise a desired execution time, a desired quality of outcome (e.g., a level of preciseness), or the like. In some exemplary embodiments, the functional level processing component may generate a CSP problem based on the constraints and goals, and solve the CSP problem using a CSP solver, thereby obtaining a selection of implementations for each functional block, that provide a global optimization.

In some exemplary embodiments, the CSP may define an objective function to be optimized. In some exemplary embodiments, the objective function may be defined based on a depth of the quantum circuit indicating a number of cycles of the quantum circuit. The CSP solver may attempt to minimize such objective function, thereby creating a shallow quantum circuit, having as few of cycles as possible. Additionally, or alternatively, the objective function may be based on an area of the quantum circuit. The area of the quantum circuit may be defined based on the depth of the quantum circuit and a number of qubits. As an example, the area may be defined as the multiplication of the number of qubits by the number of cycles. Such objective function may be minimized to provide for an optimal quantum circuit with a relatively efficient ratio between a number of cycles and a number of qubits that are utilized. It is noted that such an optimization function may be employed together with a hard constraint on the number of qubits utilized, based on availability of physical qubits in the quantum computer. Additionally, or alternatively, the optimization function may be based on a hardware error rate of the quantum circuit, thereby minimizing the hardware error of the circuit as a whole, or of a specific output value. Additionally, or alternatively, the objective function may be based on a precision error of the quantum circuit. Additionally, or alternatively, the objective function may be based on a count of utilization of gates of a predefined gate type. For example, the objective function may attempt to minimize a usage of T gates. As another example, the objective function may attempt to minimize a usage of CNOT gates, or of 2-qubit gates of any specific implementation. Additionally, or alternatively, the objective function may be based on a number of qubits utilized by the quantum circuit. It is noted that the optimization function may be based on a set of different properties and variables that represent the quantum circuit and relate to a desired optimization thereof. For example, the objective function may be defined using weights, such as: $\Sigma_i \alpha_i \cdot p_i$, where $\alpha_i$ is a weight for the i-th parameter, and $p_i$ is a value of the i-th parameter.

In some exemplary embodiments, based on the constraints, and on the functional block, a CSP solver may determine a solution to the CSP, e.g., a concrete solution that satisfies all the constraints. The solution may indicate an implementation for the functional block. In some exemplary embodiments, the solution may not be the only valid solution and may be selected based on the optimization criteria, such as attempting to minimize or maximize a target optimization function. Based on such solution, a quantum program can be created, compiled and executed on a quantum computer.

In some exemplary embodiments, a CSP representing functional-level description of the circuit may be solved, and its solution may be used to generate a quantum circuit. In some exemplary embodiments, selecting the implementation may comprise selecting a gate-level implementation of the functional block from a function library, and synthesizing the quantum circuit may comprise inlining the gate-level implementation instead of the functional block. In some exemplary embodiments, synthesis of the quantum circuit may be based on the CSP. In some exemplary embodiments, the CSP may be solved automatically, such as in order to obtain a solution to the CSP. In some exemplary embodiments, solving the CSP may include selecting an implementation for each block that adheres to the one or more constraints, while optimizing the target objective function. In some exemplary embodiments, the solution of the CSP may be determined using properties of the implementations.

In some exemplary embodiments, the function library may define a different valuation to a set of properties for each alternative implementation of the functional block. In some exemplary embodiments, selecting the implementation may be performed based on valuations of the set of properties that adhere to the one or more constraints. Additionally, or alternatively, the properties may affect the objective function and the selection may be performed so as to optimize the objective function.

In some exemplary embodiments, the set of properties may comprise a depth of the alternative implementation, defining a number of cycles of the implementation. Additionally, or alternatively, the set of properties may comprise a number of qubits utilized by the alternative implementation. Additionally, or alternatively, the set of properties may comprise a number of auxiliary qubits utilized by the alternative gate-level implementation. The number of auxiliary qubits that are utilized may be constrained to be no more than the available number of qubits in the qubit pool. Additionally, or alternatively, the properties may comprise a precision error of the alternative implementation, a hardware error rate of the alternative implementation, an entanglement caused by the alternative gate-level implementation, a number of auxiliary qubits released by the alternative gate-level implementation, a number of auxiliary qubits cleaned by the alternative gate-level implementation, or the like. The number of auxiliary qubits released, cleaned, or the like, may affect variables in the CSP relating to the qubit pool, which may be utilized when ensuring sufficient number of qubits are available and potentially ensure optimal selection of qubits from the qubit pool.

It is noted that many different CSP models may be utilized, and the disclosed subject matter is not necessarily limited to any one implementation. The CSP model may be based on the DAG. Additionally, or alternatively, the model may be defined in a similar manner to that described in U.S. patent application Ser. No. 17/149,326 filed Feb. 19, 2021, entitled "Quantum Circuit Modeling", which is hereby incorporated by reference in its entirety for all purposes without giving rise to disavowment.

One technical effect of utilizing the disclosed subject matter is to provide a selection of gate-level implementations for functional blocks that complies with multiple constraints, and which optimizes an objective function. In some exemplary embodiments, the disclosed subject matter may leverage the power of CSP solvers to provide for an optimized solution for the quantum program while adhering to the constraints of the hardware that is being utilized, and to the constraints imposed by the function of the quantum program as defined by the programmer.

Figure 4:
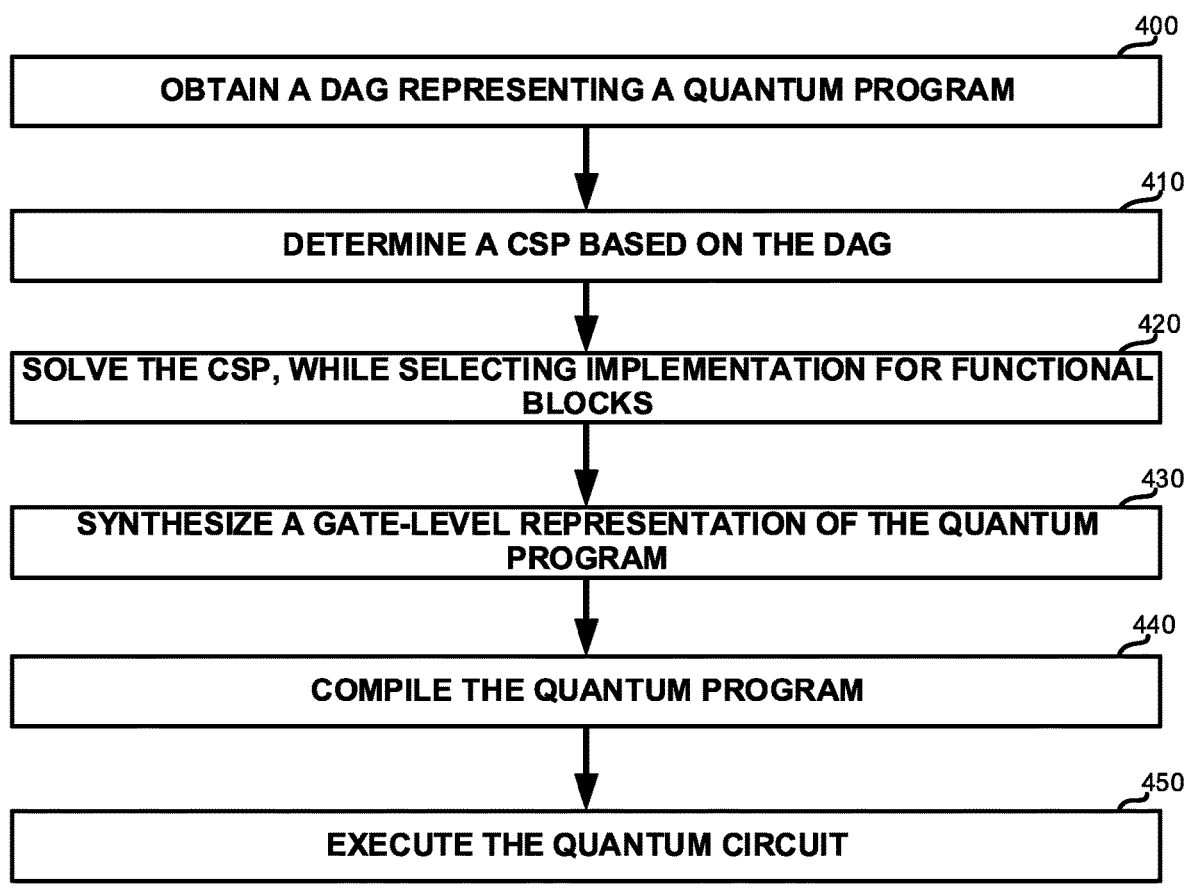
FIG. 4 shows a flowchart diagram of a method, in accordance with some exemplary embodiments of the disclosed subject matter.

Referring now to FIG. 4, showing a flowchart diagram of a method, in accordance with some exemplary embodiments of the disclosed subject matter. As depicted in FIG. 4, a DAG representing a quantum program is obtained (400). The DAG may comprise at least one node representing a functional block. In some exemplary embodiments, the DAG may comprise multiple functional blocks and edges connecting therebetween, indicating temporal relationships therebetween, output-input interfaces therebetween, or the like. Based on the DAG, a CSP is determined (410). The CSP may comprise variables that represent different aspects of the quantum program, such as but not limited to, usage of qubits, usage of a qubit in a cycle, gates defined on qubits at a cycle, information regarding qubit pool, input-output relationship between blocks, or the like. In some exemplary embodiments, the CSP may comprise an objective function to be optimized, such as a cost function to be minimized (e.g., a function relating to resource utilization by the solution), a utility function to be maximized (e.g., a function relating to a quality of the solution), or the like.

On Step 420, a solution to the CSP may be determined by a CSP solver. The CSP solver may select an implementation for each functional block. The implementations may be selected from a function library. In some exemplary embodiments, the function library may define different valuations of properties for each implementation of each function. The selection by the CSP solver may be performed while taking into account the different valuations. For example, the different valuations may be utilized to ensure that hard constraints are met. Additionally, or alternatively, the different valuations may be utilized to optimize the objective function.

Using the solution of the CSP, a gate-level representation of the quantum program may be synthesized (430), compiled (440) and executed (450). In some cases, simulated execution using classic computer may be performed instead of or in addition to actual execution using a quantum computer.

One technical problem dealt with by the disclosed subject matter is to enable a gate-level processing component to utilize insights, data, artifacts, or the like, that are available at the functional-level processing component.

One technical solution provided by the disclosed subject matter may include utilization of metadata from a function-level processing component, at a gate-level processing component. In some exemplary embodiments, the processing of the quantum program provided by the programmer may be divided between a functional-level processing component, which may process the functional-level representation of the quantum circuit and between a gate-level processing component, which may process the synthesized output of the functional-level processing component: a gate-level representation of the quantum program. In some exemplary embodiments, the gate-level processing component may be configured to compile gate-level representations of quantum circuits to thereby synthesize respective executable circuits that can be executed by a quantum computer.

While the functional-level processing component may be privy to functional-level insights, such insights and similar information may be provided to the gate-level processing components for it to be used in the gate-level processing as well. In some exemplary embodiments, the gate-level representation of the quantum circuit may be compiled, e.g., based on metadata obtained from the functional-level processing component and representing information regarding an implementation of a functional block.

In some exemplary embodiments, compiling the gate-level representation may comprise performing a connectivity independent optimization on the gate-level representation of the quantum circuit, which may utilize the metadata. Additionally, or alternatively, the compilation may comprise performing a hardware connectivity optimization on the gate-level representation of the quantum circuit, which may be based on the metadata. In some exemplary embodiments, compiling the gate-level representation may comprise identifying a portion of the gate-level implementation that represents a function associated with the functional block, e.g., based on the metadata, and utilizing information regarding the functional block at a gate-level analysis.

In some exemplary embodiments, metadata from a functional-level processing component may be obtained. In some exemplary embodiments, the metadata may comprise an artifact associated with the gate-level implementation of the functional block. In some exemplary embodiments, the metadata may be provisioned to the gate-level processing component together with the gate-level representation of the quantum circuit. Additionally, or alternatively, the metadata may be obtained from the functional-level processing component on demand, when the gate-level processing component requires such information. In some exemplary embodiments, the gate-level processing component may query the functional-level processing component for the metadata for the entire quantum program, or for specific portions thereof. In some exemplary embodiments, the query may be configured to invoke the functional-level processing component to provide the metadata associated with the functional-level representation. In some exemplary embodiments, the query may utilize an Application Programming Interface (API) of the functional-level processing component.

In some exemplary embodiments, the gate-level processing component may utilize the metadata to identify a gate-level implementation of a function within the gate-level representation of the quantum circuit. In some exemplary embodiments, the metadata may define an area of the quantum program that corresponds to a functional block in the functional-level representation of the quantum program. For example, the metadata may indicate a range of cycles and a set of qubits that are utilized during the range of the cycles to implement the functional block. It is noted that the set of qubits may be referred to as a "range" of qubits, however, such "range" need not be consecutive. For example, the "range" may include the following set of ten qubits: $q_1$, $q_3$, $q_{10}$, . . . , $q_{17}$. In some exemplary embodiments, the metadata may be leveraged to allow the gate-level processing component to utilize functional-level insights for its operation.

In some exemplary embodiments, the gate-level processing component may receive the metadata and use it to process a function at the gate-level. In some exemplary embodiments, the metadata may enable the gate-level processing component to identify a sub-circuit as a function, to store information for future use in a same context, or the like. In some exemplary embodiments, the metadata may comprise a Logical Data Precedence Graph (LDPG), which can be used for scheduling quantum circuits, such as disclosed in Guerreschi et al., "Two-step approach to scheduling quantum circuits", Quantum Sci. Technol. 3 045003 (2018) (hereinafter: "Guerreschi"), which is hereby incorporated by reference in its entirety for all purposes. Additionally, or alternatively, the metadata may comprise a priority table, such as Physical Data Precedence Table (PDPT), disclosed in Guerreschi. The PDPT may be a table with as many rows as qubits in the hardware and one column for each cycle required to schedule either logical gates or routing operations. In some exemplary embodiments, the PDPT and LDPG may be utilized for compiling and optimizing the gate-level representation of the quantum program. In some exemplary embodiments, the metadata may comprise a closeness matrix. In some exemplary embodiments, the closeness matrix may indicate for two qubits the number of gates they share. In some exemplary embodiments, the closeness matrix may indicate the number of gates each two qubits share. The closeness matrix may be useful for selecting physical qubit placement for logical qubits, so as to reduce distance between qubits that interact with one another. Additionally, or alternatively, the metadata may comprise entanglement properties of qubits in a portion of the gate-level implementation of a function associated with the functional block. In some exemplary embodiments, entanglement and coherence properties may be calculated by executing the instance many times on a quantum computer. Such information may be useful for improved optimization during the compilation of the gate-level representation of the quantum circuit. In some exemplary embodiments, the metadata may comprise a property computed using quantum computing. Such property may be hard to compute and require intensive resources in order to compute. However, the metadata may be a-priori prepared irrespective of the specific quantum circuit, and therefore there may be sufficient time and resources to compute such information. Specifically, a quantum computer may be utilized in itself to compute the metadata. In some exemplary embodiments, the metadata may comprise an error rate per qubit in the gate-level representation of the quantum circuit. In some exemplary embodiments, hardware error rates may be architecture dependent and may depend on the time the instance takes and the number and type from each qubit. For example, in case the implementation takes 200 milliseconds to execute and includes 10 gates of type 1 and 7 of type 2. Such information may be useful for placement decisions by the gate-level processing component, such as placing logical qubits on physical qubits. It is noted that the error rate may be relatively hard to compute at the gate-level. In some cases, the hardware error rate may be measured in advance by executing the implementation on a quantum computer. Such measurement may be better than a simulated hardware error, which can be computed using a simulation of the execution of the implementation.

In some exemplary embodiments, the metadata may be prepared in advanced prior to the compilation of the quantum circuit. In some exemplary embodiments, the preparation of the metadata may require a relatively large period of time such as 30 minutes, 60 minutes, 2 hours, a day, three days, or the like. In some exemplary embodiments, preparing the metadata may enable to provision functional-level information to be utilized in gate-level processing component.

In some exemplary embodiments, compiling the gate-level representation may comprise determining that a qubit of the set of qubits represents an auxiliary qubit. In some exemplary embodiments, the determination may be based on information provided to the gate-level processing component via the metadata. In some exemplary embodiments, the metadata may indicate at which cycle the qubit serves as an auxiliary qubit, indicating information regarding its value before that cycle. In some exemplary embodiments, an auxiliary qubit may initially be set to zero and not be entangled with any additional qubit. Such information may be useful for optimizations performed at the gate-level. Additionally, or alternatively, the metadata may indicate at which cycle the qubit is cleaned, returning to its initial zero value and having no entanglement.

In some exemplary embodiments, compiling the gate-level representation may comprise identifying, in the gate-level representation of the quantum circuit, an implementation of the functional block. In some exemplary embodiments, the implementation of the functional block may be determined by the functional-level processing component at a functional-level analysis of the functional-level representation of the quantum circuit. However, the gate-level processing component may determine that the selected implementation is sub-optimal or undesired for any reason. Accordingly, the implementation may be replaced, by the gate-level processing component, with an alternative implementation, in whole or in part. Such analysis may be performed thanks to the metadata identifying the implementation and its original functional meaning. In the absence of the metadata, identifying a portion of the gate-level representation and determining its functionality may be a computationally hard task.

In some exemplary embodiments, the functional-level processing component may be hardware independent, while the gate-level processing component is hardware-specific. In some exemplary embodiments, the functional-level processing component and the gate-level processing component may be provided by different vendors.

In some exemplary embodiments, the metadata may comprise a re-usable value of a parameter that was previously computed by the gate-level processing component based on an implementation of the functional block in another quantum circuit. In some exemplary embodiments, during its operation, the gate-level processing component may compute an artifact for a specific implementation of a functional block. Instead of re-computing such artifact each time the implementation is encountered, the gate-level processing component may provide the artifact to the functional-level processing component to be retained for future processing of other quantum circuits. In some exemplary embodiments, the re-usable value of the parameter may be available to the gate-level processing component and may not be made available to other gate-level processing components. For example, the artifact may be a proprietary information of the vendor of the gate-level processing component and may not be shared with other gate-level processing components. In some exemplary embodiments, the functional-level processing component may be configured to provide a separate storage of re-usable values of parameters for different gate-level processing components for a same functional block. It is noted that the functional-level processing component may be unaware of the actual meaning of the artifact and its usage. The artifact may also be provided in an encoded or encrypted manner. The gate-level processing component may utilize the functional-level processing component as a contextual storage that may retain information useful for the gate-level processing component with respect to implementations of functional blocks.

In some exemplary embodiments, the metadata may comprise artifacts that can help the gate-level analysis, such as by helping or solving problems downstream at the gate-level. For example, for each instance, the LDPG and PDPT can be prepared once for each implementation and re-used to reduce required calculations when compiling specific quantum circuits. In some exemplary embodiments, a compiler that does connectivity optimization may be interested in the interaction graph of the implementation, which may be generated in advance. In general, the function library may include, for each instance, artifacts that compilation level may need.

One technical effect of utilizing the disclosed subject matter is providing downstream components such as the gate-level processing component with functional-level information that may enable the gate-level processing component to process and manipulate information using functional-level information, without having access to the functional-level representation of the circuit.

Another technical effect may be to improve quality and speed of the gate-level analysis by leveraging functional-level information and pre-computed information regarding the implementations that are utilized in the gate-level representation of the quantum program. In some cases, the pre-computed information may be prepared together with the preparation of the function library, such as utilizing different computational resources (e.g., quantum computer), substantial time resources, or the like. Additionally, or alternatively, the pre-computed information may be proprietary to the vendor of the gate-level processing component and computed thereby in a previous encounter with the same implementation.

Figure 5:
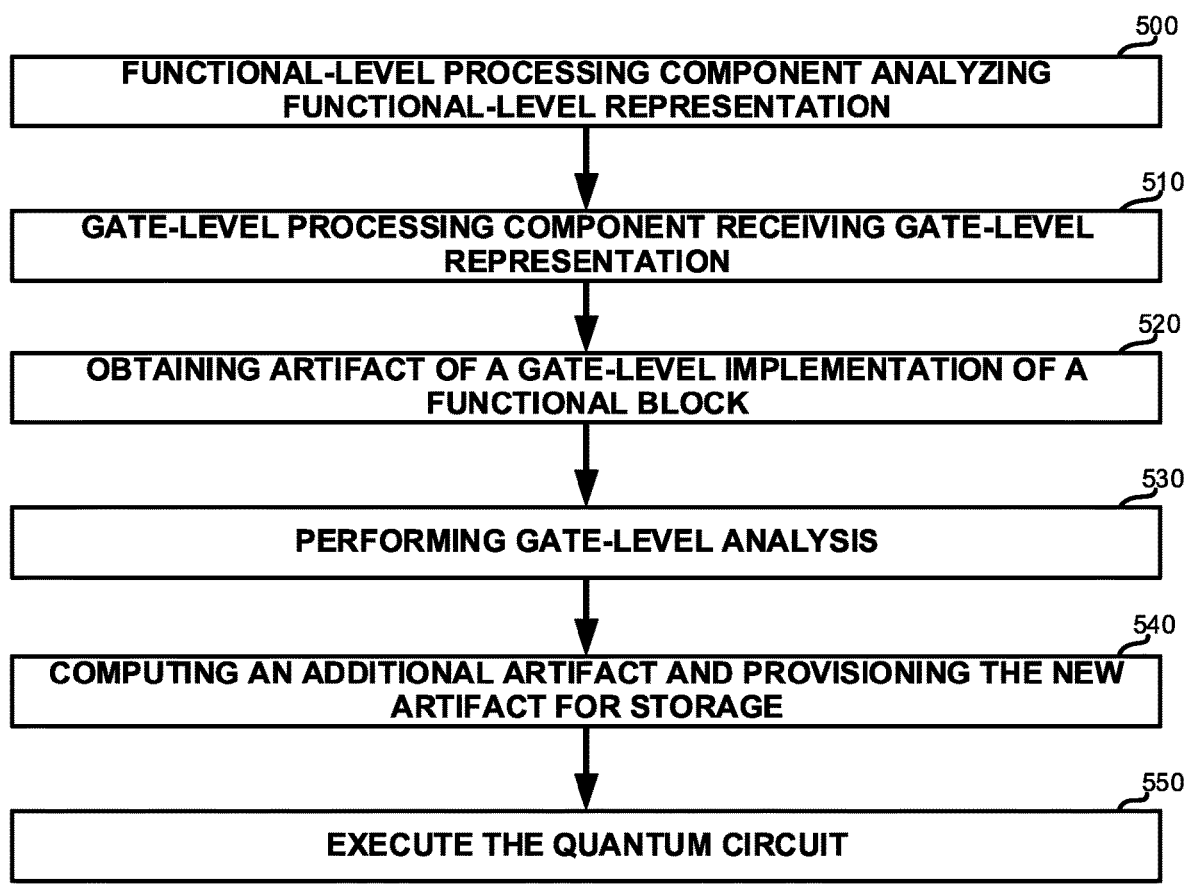
FIG. 5 shows a flowchart diagram of a method, in accordance with some exemplary embodiments of the disclosed subject matter.

Referring now to FIG. 5, showing a flowchart diagram of a method, in accordance with some exemplary embodiments of the disclosed subject matter.

On Step 500, a functional-level processing component processes a functional-level representation of a quantum program. In some exemplary embodiments, the processing may comprise inlining or otherwise replacing a functional block with a gate-level implementation thereof. The gate-level-implementation may be obtained from a function library, and may be associated with pre-computed artifacts. In some exemplary embodiments, the functional-level processing component may generate a gate-level representation of the quantum program, which includes the gate-level implementation of the functional block.

On Step 510, the gate-level processing component may obtain the gate-level representation of the quantum program, such as via an API or other invocation by the functional-level processing component.

On Step 520, the gate-level processing component may obtain an artifact of the gate-level implementation. The artifact may be obtained together with the gate-level representation of the quantum program. For example, all artifacts that are available for all implementations utilized in the synthesis of the gate-level representation of the quantum program may be provided together therewith. In some cases, only artifacts that the gate-level processing component has access permission to may be provisioned. Additionally, or alternatively, the gate-level processing component may utilize an API to query the functional-level processing component and request specific artifacts for specific implementations. In some cases, the functional-level processing component may provide a list of implementations in the gate-level representation of the quantum program, locations thereof, functionality thereof, or the like. The gate-level processing component may query, on demand, for desired artifacts. As an example, the query may be getArtifact($I_a$, "LDPG"), requesting the LDPG artifact for implementation $I_a$. Additional non-limiting examples of queries may be getArtifact($I_a$, "Location"), requesting location artifact indicative of the location of the implementation in the gate-level representation of the quantum program; getArtifact($I_a$, "A"), requesting artifact "A", whose meaning may only be known to the gate-level processing component.

On Step 530, gate-level analysis may be performed using the artifact(s) obtained on Step 520. In some exemplary embodiments, the gate-level analysis may utilize the artifact to reduce computations required during the compilation to perform a desired optimization. Additionally, or alternatively, the artifact may be utilized to identify an implementation and replace it with a desired alternative implementation, preferred over the implementation that the functional-level processing component has chosen. It is noted that as the two processing components may be provisioned by different vendors, the vendor may have a different view of a preferred implementation.

In some exemplary embodiments, during the gate-level analysis, a new artifact may be computed by the gate-level processing component with respect to the gate-level implementation of the functional block. On Step 540, the gate-level processing component may provision the new artifact to the functional-level processing component to be retained and re-used in the future. In future processing, the gate-level processing component may receive the new artifact when performing Step 520 with respect to other quantum circuits. Additionally, or alternatively, the gate-level processing component may instruct the functional-level processing component to update an existing value of an artifact. As an example, the gate-level processing component may implement an iterative processing in which each time the implementation is encountered, the artifact is improved further while utilizing a limited amount of time and computational resources. In such embodiments, after several iterations, a more accurate artifact may be obtained, without causing the amount of time and resources required for the compilation of a quantum circuit to be unreasonable to a user.

The compiled quantum program may be executed or simulated on Step 550.

One technical problem dealt with by the disclosed subject matter is to enable a functional-level processing component to respond to modifications performed at the gate-level. In some cases, a gate-level compiler may make potentially radical changes to the gate-level description. For example, the gate-level processing component may replace one implementation by another. As another example, the gate-level processing component may change the qubit selection, may replace gates utilized by the circuit, or the like. It may be desired to enable the functional-level processing component to take into account such modifications.

Another technical problem dealt with by the disclosed subject matter is to provide a functional-level analysis for generating a sub-circuit, which can be combined with another sub-circuit provided from another source to create the circuit.

One technical solution provided by the disclosed subject matter may include re-generating a gate-level quantum circuit based on a gate-level analysis. The re-generation may be performed by a functional-level processing component.

In some exemplary embodiments, at a functional-level processing component, a functional-level representation of a quantum circuit, which comprises at least one functional block, may be obtained. A gate-level representation of the quantum circuit may be synthesized based on the functional-level representation of the quantum circuit. In some exemplary embodiments, the gate-level representation of the quantum circuit may comprise a set of quantum gates defining operations on a set of qubits. In some exemplary embodiments, the gate-level representation of the quantum circuit may comprise a first sub-circuit and a second sub-circuit. In some exemplary embodiments, the gate-level representation may be provided to a gate-level processing component. The gate-level processing component may modify or otherwise change the circuit, e.g., by modifying the first sub-circuit and creating a modified first sub-circuit instead. In some exemplary embodiments, the gate-level processing component may provide to the functional-level processing component a change indication. The change indication may indicate that modification made by the gate-level processing component, e.g., indicating that a modified first sub-circuit was created instead of the first sub-circuit initially generated by the functional-level processing component.

In some exemplary embodiments, the change indication may be an explicit indication providing the details of the change itself, such as providing the gate-level representation of the modified first sub-circuit. Additionally, or alternatively, the change indication may be an implicit indication regarding the effects of the knowledge that the modified first sub-circuit exists as part of the circuit. In some exemplary embodiments, the change indication may comprise an indication of resources utilized by the modified first sub-circuit. In some exemplary embodiments, the resources utilized by the modified first sub-circuit may comprise a number of qubits utilized by the modified first sub-circuit, number of cycles of the modified first sub-circuit, area of the first sub-circuit, hardware error rate caused by the modified first sub-circuit, or the like.

As an example, the number of qubits utilized by the modified first sub-circuit may be smaller than a number of qubits utilized by the first sub-circuit. Accordingly, qubit resources may be freed to be utilized by the remainder portion of the sub-circuit. In some exemplary embodiments, the remainder portion may be re-synthesized taking into account the freed resources as well as previously available resources, to generate a modified second sub-circuit. The first and second sub-circuits may be combined to form a modified circuit.

As yet another example, the model of the quantum circuit is to generate the gate-level representation may be modified so as to indicate the modified resources for the specific instance, as indicated by the change indication. The model may then be used to generate a modified gate-level representation taking into account the change indication. Consider, for example, a case where the generation is performed using a CSP solver which had erroneously believed that the optimal instance utilizes 58 cycles, while the gate-level compiler had improved the circuit and provided an improved version utilizing only 57 cycles. The reduction in cycles may be leveraged to provide a different gate-level representation which is improved with respect to the original generated version.

As yet another example, the resource change may adversely affect the available resources of the remainder portion, and the modified second sub-circuit may accordingly utilize less resources.

As yet another example, the resources utilized by the modified first sub-circuit may comprise a number of cycles that are included in the modified first sub-circuit. In some exemplary embodiments, the number of cycles included in the modified first sub-circuit may be smaller than a number of cycles included in the first sub-circuit, whereby cycle resources are freed to be utilized in synthesizing the modified second sub-circuit. Alternatively, the number of cycles included in the modified first sub-circuit may be larger than a number of cycles included in the first sub-circuit. In some exemplary embodiments, a set of one or more qubits may be idle during at least one cycle of the modified first sub-circuit, whereby parallel execution during the at least one cycle may be enabled. The modified second sub-circuit may be configured to utilize the idle qubits to perform parallel execution by the quantum circuit.

In some exemplary embodiments, synthesizing the gate-level representation of the quantum circuit may be performed using a model of the quantum circuit, such as a CSP model. In some exemplary embodiments, synthesizing the modified second sub-circuit may performed using a modified model of the quantum circuit in which the modified first sub-circuit is included as an invariant that cannot be changed. In some exemplary embodiments, a gate-level representation of the invariant may be included in the modified model. Additionally, or alternatively, the modified first sub-circuit may be a black box whose implementation details are devoid from the modified model. In some exemplary embodiments, the modified model may include resource utilization of the modified first sub-circuit, such as a number and potentially identity of qubits allocated for the modified first sub-circuit, a number and potentially identity of cycles during which the modified first sub-circuit operates, or the like. The modified model may be utilized to generate the modified second sub-circuit, which may be integrated with the modified first sub-circuit to create the quantum circuit.

It is noted that the change induced by the modification of the first sub-circuit may cause a potentially major difference in the second sub-circuit. As one notable example, the second sub-circuit may comprise a first implementation of the functional block, which may be selected or generated at the functional-level. However, when re-synthesis is performed with respect to the remainder portion of the circuit, taking into account the existence of the modified first sub-circuit, a different, second, implementation of the functional block may be selected or generated, which may have different properties than the first implementation. For example, the second implementation may require a different number of qubits, may require a different number of cycles, may induce a different entanglement on potentially different qubits, require a different amount of auxiliary qubits, clean a different amount of auxiliary qubits, release qubits at different cycles, be associated with a different computational cost of performed cleanup, induce a different hardware or precision error rate, or the like.

It is noted that in some cases, the gate-level processing component may have a potentially better understanding of local optimizations in the gate-level representation of the circuit. In some cases, the gate-level processing component may improve the overall resource utilization, so that the resource utilization of the quantum circuit representation that is created based on the modified first sub-circuit may be a Pareto improvement over the resource utilization of the originally synthesized quantum circuit representation. The Pareto improvement may improve at least one resource utilization and would not adversely affect any resource utilization (e.g., improve qubit resource utilization without deteriorating utilization of the cycle resources).

Another technical solution is to provide a functional-level processing component that is capable of synthesizing a sub-circuit of the gate-level representation of a quantum circuit, while taking into account a pre-provided sub-circuit of the gate-level representation that would also be included in the same circuit. As an example, one sub-circuit may be mandated by the gate-level processing component, while the other sub-circuit may be generated by the functional-level processing component so as to be combined therewith. The functional-level processing component may not be aware of the details of the invariant sub-circuit, and instead may relate to such invariant based on its interface with the remaining portions of the circuit (e.g., input-output interface), based on resources consumed thereby, or the like. In some cases, the pre-provided sub-circuit may be a black box whose implementation details are unknown but its affects from a functional-level perspective are well defined.

One technical effect of utilizing the disclosed subject matter is to enable improved synthesis of quantum circuits, based on gate-level knowledge.

Figure 6:
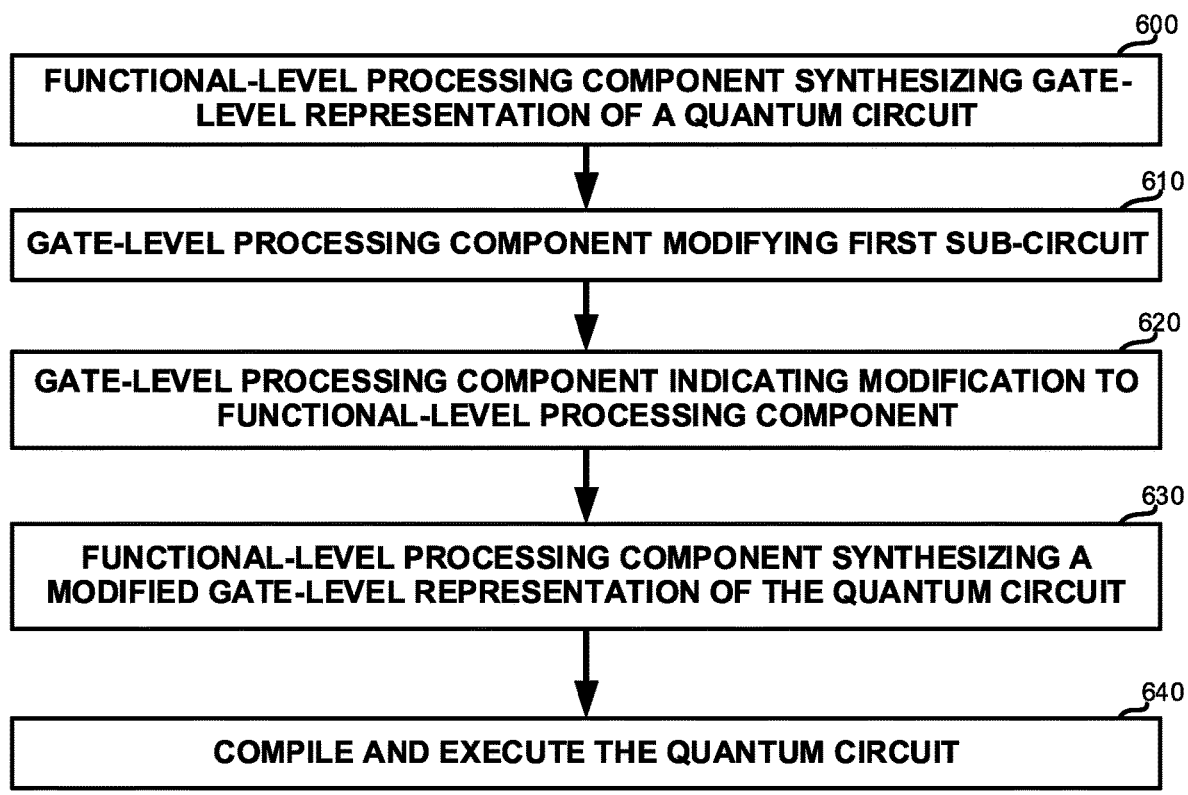
FIG. 6 shows a flowchart diagram of a method, in accordance with some exemplary embodiments of the disclosed subject matter.

Referring now to FIG. 6, showing a flowchart diagram of a method, in accordance with some exemplary embodiments of the disclosed subject matter.

On Step 600, a functional-level processing component may synthesize a gate-level representation of a quantum circuit. In some exemplary embodiments, the functional-level processing component may process a functional-level representation of the quantum circuit, which may include functional blocks. In some exemplary embodiments, the functional-level processing component may inline gate-level implementations to replace the functional blocks.

On Step 610, the functional-level processing component may provide the gate-level representation to a gate-level processing component. The gate-level processing component may process the gate-level representation. In some exemplary embodiments, the gate-level processing component may modify the quantum circuit. In some exemplary embodiments, the gate-level processing component may modify a gate-level implementation of the functional block. In some cases, the modification may be performed in a specific location within the implementation. Additionally, or alternatively, the gate-level processing component may replace one implementation by another implementation. In some exemplary embodiments, the gate-level processing component may be aware of which functional block is modified based on an artifact provided by the functional-level processing component identifying sub-circuits which are associated to each functional block. In some exemplary embodiments, the modification may be performed to one implementation of the functional block. Additionally, or alternatively, the modification may affect several implementations of different functional blocks.

On Step 620, the gate-level processing component may indicate the modification was performed to the functional-level processing component. In some exemplary embodiments, the gate-level processing component may determine whether or not to report such modification. In some cases, the determination may depend on the affect the modification has on the resources utilized by the functional block, a difference measurement between original implementation and modified implementation exceeding a threshold, based on past decisions and their outcomes, or the like. In some exemplary embodiments, an Artificial Intelligence (AI) module may implement machine learning, deep learning, or the like, to predict whether a modification should be reported. The AI module may be trained using past outcomes, indicating whether the gate-level modification induced a change (or a substantial change, i.e., a change of more than a measurable threshold) in the modified gate-level that is the outcome of a re-synthesis.

In some exemplary embodiments, the indication may indicate the precise content of the sub-circuit, providing a white box description of the implementation. Additionally, or alternatively, a black box methodology may be utilizes and only interfaces, resource utilization or other similar properties may be provided. In one example, the gate-level processing component may implement a proprietary undisclosed algorithm and its owner may wish to reduce the ability of the developer of the functional-level processing component to reverse engineer such algorithm. In such a case, the gate-level processing component may avoid providing the functional-level processing component the actual modifications made to the gate-level representation. In such an embodiment, the combination of the modified second sub-circuit (generated on Step 630 below) with the modified first sub-circuit may be performed by the gate-level processing component instead of by the functional-level processing component.

On Step 630, a modified gate-level representation of the quantum circuit may be synthesized. In some exemplary embodiments, the functional-level processing component may re-synthesize the gate-level representation, taking into account the modifications of the first sub-circuit. In some cases, the entire circuit may be synthesized while setting invariants ensuring that the modified first sub-circuit remains unchanged. Additionally, or alternatively, the remainder portion of the circuit, also referred to as the second sub-circuit, may be processed on its own, while taking into account its interface with the first sub-circuit. In some exemplary embodiments, the modified second sub-circuit may be integrated with the modified first sub-circuit by either the gate-level processing component or the functional-level processing component.

On Step 640, the synthesized quantum circuit may be compiled and executed. In some exemplary embodiments, the compilation may be performed by the gate-level processing component. Additionally, or alternatively, the execution may be performed on a simulator of a quantum computer, on an emulator of a quantum computer, on a quantum computer, or the like.

In some exemplary embodiments, during compilation on Step 640 additional modifications may be performed. In some exemplary embodiments, the gate-level processing component may determine to provide yet another modification indication to the functional-level processing component for further processing. In such cases, Steps 620-630 may be re-performed. Once compilation is completed, execution is performed. It is further noted that the determination whether or not to provide the modification indication may be based on the amount of time elapsed since the quantum circuit has started to be processed. In some cases, the disclosed subject matter may be implemented as a two-part compiler including a functional-level compiler and a gate-level compiler. From the perspective of the user, compilation should end within a reasonable time, such as within a few seconds, a few minutes, 10 minutes, 20 minutes, less than an hour, or the like. Once compilation begins, the functional-level compiler may record the time or otherwise trigger a timer. The determination by the gate-level compiler may be based on the time elapsed since the recorded time or as indicated in the timer. Additionally, or alternatively, in case the functional-level compiler does not share initialization time, the gate-level compiler may track the first time it was invoked and base its decision based thereon. In some cases, the gate-level elapsed time can be used estimate the overall compilation time, such as by measuring, by the gate-level compiler, the time it took the functional level compiler to re-synthesize the circuit on Step 630. Such measured time may be used to estimate the initial synthesis time that was not shared with the gate-level compiler.

Figure 7:
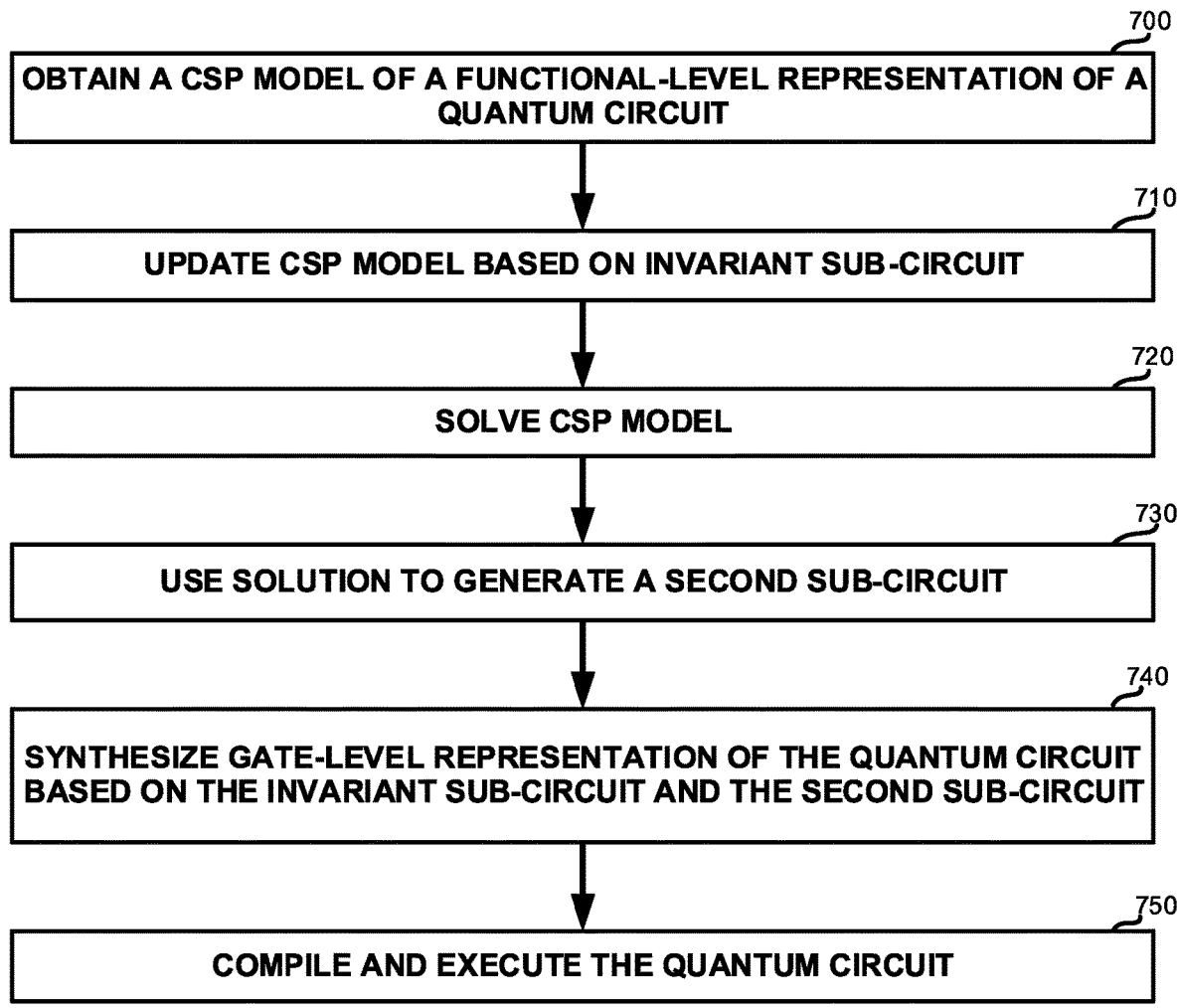
FIG. 7 shows a flowchart diagram of a method, in accordance with some exemplary embodiments of the disclosed subject matter.

Referring now to FIG. 7, showing a flowchart diagram of a method, in accordance with some exemplary embodiments of the disclosed subject matter.

On Step 700, a model of the quantum circuit is obtained. The model may model the functional-level representation of the quantum circuit. In some exemplary embodiments, the model may be a CSP model. The model may represent the circuit using a DAG. Additionally, or alternatively, the model may define blocks, including functional blocks, and define the interfaces therebetween.

On Step 710, the model may be updated based on an invariant. In some exemplary embodiments, the invariant may be a sub-circuit that is determined to be included in the circuit, such as a specific implementation of a functional block in the circuit. In some exemplary embodiments, the model may be the initial relaxed model used by the functional-level processing component to synthesize the initial gate-level representation. Based on an invariant reported by the gate-level processing component, the model may be updated. It is noted that the invariant may be defined by other entities or components. As an example, a user may provide a specific implementation to be used for a functional block in a manual manner, setting the attributes of the model that relate to that functional block to be constant and unchanged. In some exemplary embodiments, the model may initially be created with the invariant instead of creating an initial model and updating it thereafter.

On Step 720, the model may be used to determine a solution that hold all the constraints of the model. In some exemplary embodiments, the solution may be determined so as to attempt to optimize an objective function. In some exemplary embodiments, the model may be a CSP model, and the model may be solved using a CSP solver. In some exemplary embodiments, the CSP solver may be executed on a partial model. Additionally, or alternatively, the CSP solver may be executed on a full model with different values for some attributes. The solution of the model may be used to define a second sub-circuit (730), which in turn may be combined with the invariant sub-circuit to synthesize the gate-level representation of the quantum circuit. Such representation may be compiled an executed (750).

Referring now to FIGS. 8A-8D showing illustrations of quantum circuits, in accordance with the disclosed subject matter.

Figure 8A:
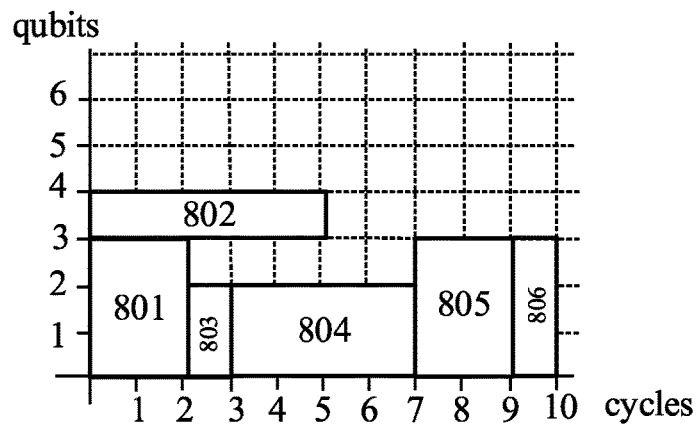
FIGS. 8A-8D show exemplary illustrations of quantum circuits, in accordance with some exemplary embodiments of the disclosed subject matter.

FIG. 8A exemplifies a quantum circuit implementing 6 function blocks by Implementations 801, 802, 803, 804, 805, 806. Each implementation has a different resource utilization illustrated as a rectangular area showing the qubits which are utilized thereby and the number of cycles in which they are used.

Figure 8B:
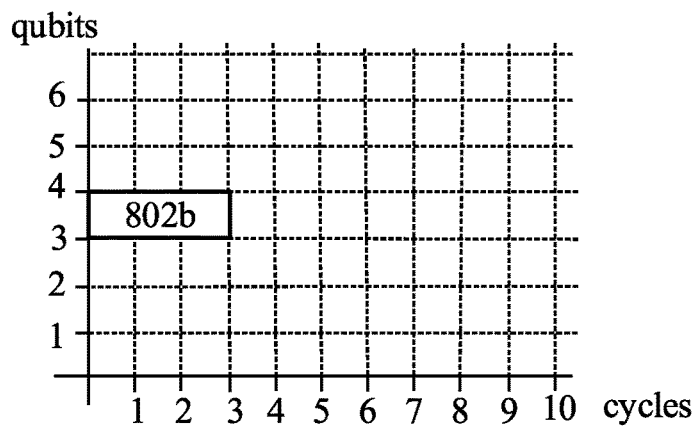

FIG. 8B illustrates an invariant. In this example, the functional block implemented by Implementation 802 using one qubit for five cycles, is implemented differently. Implementation 802*b* uses a single qubit for only 3 cycles. The details of such implementation may be kept undisclosed. However, such a change enables to provide an improved circuit.

Figure 8C:
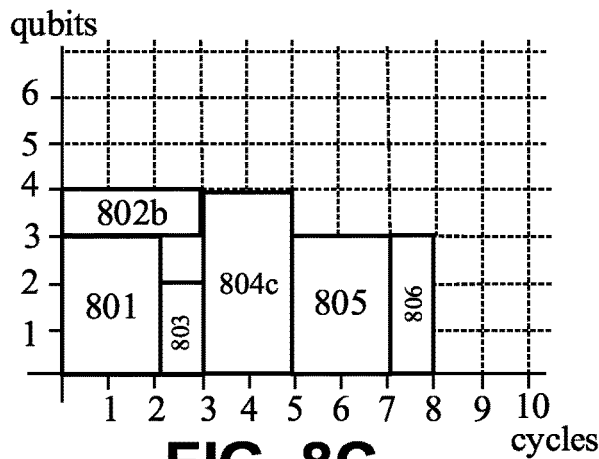
Figure 8D:
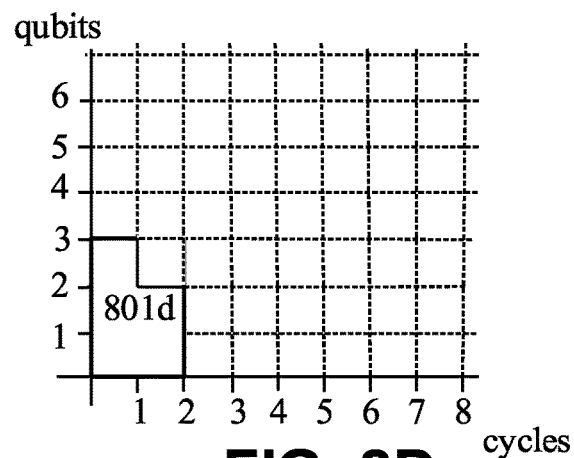

FIG. 8C illustrates such an improved circuit which is created based on the existence of the invariant implementation: Implementation 802*b*. Implementations 801, and 803 may remain unchanged. However, instead of Implementation 804, which used two qubits for four cycles, the disclosed subject matter may now synthesize a different implementation: Implementation 804*c*, using 4 qubits for two cycles. In view of such a change, Implementations 805 and 806, which are not changed, may be performed earlier. As a result of such modification, the area of the circuit is reduced from 40 (4 qubits by 10 cycles) in FIG. 8A to 32 (4 qubits by 8 cycles).

It is noted that in some cases, instead of a rectangular shape, an implementation may be represented by a polygon. For example, if qubit 3 is released by Implementation 801 after the second cycle, the implementation may reflect the fact that such qubit is no longer allocated for the implementation at that cycle, as is illustrated in Implementation 801*d* of FIG. 8D. It is noted that similarly, a qubit may be allocated for an implementation after the implementation commences (e.g., in cycle #2). Some qubits may be allocated in the middle of the execution of the implementation, some may be released in the middle of the execution of the implementation, or the like. In some cases, a qubit may be allocated after the implementation commences and before it ends. Each qubit may have a different time segment in which it is associated with the implementation and the determination of the optimal solution may differ based on the different time segments each qubit requires. It is noted that such information may be utilized regardless of its source. As an example, qubit-specific information may be included in an artifact relating to an implementation. In some exemplary embodiments, the function library may comprise for each implementation a set of entries comprising (qubit, (start cycle, end cycle)), indicating for each qubit a relative start cycle with respect to the implementation (e.g., starting on the first cycle of the implementation, cycle 1, or later) and a respective relative end cycle after which the qubit may be utilized by other implementations. As another example, such information may be determined at the gate-level analysis and may be provided back to the functional-level processing component. Additionally, or alternatively, such information may be provided as part of the metadata regarding implementations in the function library.

One technical problem dealt with by the disclosed subject matter is to utilize implementations of functional blocks that are not available within a function library.

One technical solution provided by the disclosed subject matter may include dynamically generating gate-level implementations of functional blocks in quantum circuits, while taking into account pre-defined constraints.

In some exemplary embodiments, a functional-level representation of a quantum circuit may be obtained. The functional-level representation of the quantum circuit may comprise a functional block within the quantum circuit. An indication of one or more resources that are available to the functional block may be obtained. In some exemplary embodiments, the indication of the one or more resources may comprise at least an indication regarding a range of cycles and an indication regarding a number of qubits available for the implementation of the functional block.

In some exemplary embodiments, the indication of the one or more resources may be determined based on various sources. As an example, a hardware-level compiler compiling a previous version of the quantum circuit may compute and determine the remaining resources, which may or may not be updated based on a gate-level processing analysis. In some exemplary embodiments, the previous version of the quantum circuit may be generated based on the functional-level representation of the quantum circuit. During compilation of the previous version of the quantum circuit, the hardware-level compiler modified the previous version of the quantum circuit, thereby causing the one or more resources to become available to the functional block. An indication may be provided to the functional-level processing component and utilized to re-synthesize a modified gate-level representation. As another example, the available resources may be computed or determined based on an analysis of the functional-level representation of the quantum circuit. The functional-level analysis may identify the amount of resources that are allocated to other portions of the quantum circuit.

In some exemplary embodiments, the indication may indicate a number of qubits that are available to the functional block during a timeframe. In some cases, the indication may indicate respective number of qubits during different respective timeframes. For example, the gate-level implementation may allocate a qubit to its usage after it has commenced execution for several cycles. As another example, the gate-level implementation may release a qubit before the completion of its execution, releasing a qubit from its associated resources. In some exemplary embodiments, the gate-level implementation may utilize a different number of qubits for at least a portion of the first timeframe compared to a number set of qubits utilized by the gate-level implementation of the functional block during at least a portion of the second timeframe, where the first time frame may immediately precede the second timeframe, e.g., a last cycle of the first timeframe may immediately precedes a first cycle of the second timeframe. In some exemplary embodiments, the number of qubits available in the first timeframe may be smaller than the number of qubits available during the second timeframe, and, during the first timeframe, one or more qubits may be released by a portion of the quantum circuit that is external to the functional block. Additionally, or alternatively, the number of qubits available in the second timeframe may be smaller than the number of qubits available during the first timeframe, such as due to an allocation of a qubit to a portion of the quantum circuit that is external to the functional block during the execution of the functional block. Additionally, or alternatively, the number of available qubits may be identical, but their identity may be different (e.g., a qubit is released, and another is allocated in the same cycle). In some exemplary embodiments, the implementation may utilize different sets of qubits in different timeframes, even in cases where the number of qubits is identical.

In some exemplary embodiments, the indication of the one or more resources may comprise an indication of a qubit that is available for a timeframe under a constraint on using the qubit. The constraint may be a constraint on how the qubit is utilized by the functional block. As an example, the constraint may require that the value of the qubit is restored at an end of the timeframe to its original state at a beginning of the timeframe. In some cases, a qubit can be released without being cleaned as it may not be utilized by a block for an intermediate timeframe starting after the commencement of the execution of the implementation and ending before the execution is concluded. For example, a qubit may be utilized for ten cycles, may not be used for fifty cycles, and thereafter used for the five more cycles, to complete the computation of a specific block. In such a case, the qubit may be allocated to be utilized by other blocks if it is ensured that the value of the qubit at cycle #60 remains as computed at cycle #10. In some exemplary embodiments, a dirty qubit can be used in the intermediate timeframe, as may be relevant in certain circuits. Additionally, or alternatively, The intermediate timeframe can be used to uncompute the previous value of the qubit, to utilize the qubit for additional computations, and restore the original value, such as by uncomputing the new value and re-set the original value. It is noted that the value in such cases includes all relevant properties, including entanglement with other qubits. It is noted that setting of a value to its original state can be performed using the controlled propagation operation disclosed in U.S. application Ser. No. 17/354,504, entitled "CONTROLLED PROPAGATION IN QUANTUM COMPUTING", filed Jun. 22, 2021, which is hereby incorporated by reference in its entirety for all purposes without giving rise to disavowment. As another example, the constraint may require that the value of the qubit is cleaned, such as set to zero and without being entangled with other qubits. Such a constraint may be useful to ensure that the qubit can be used as an auxiliary qubit at a later stage, even if such qubit was not originally set to the zero state.

In some exemplary embodiments, a gate-level implementation of the functional block that adheres to the indication of resources may be dynamically generated. In some exemplary embodiments, the dynamic generation may be performed without relying on a pre-existing function library. In some exemplary embodiments, the gate-level implementation of the functional block may dynamically generated based on reversible pebble game. The reversible pebble game may be performed with respect to the functional block being processed, and without addressing the entire quantum circuit. In some cases, there may be at least one additional gate that is implemented in the quantum circuit that is not the outcome of the reversible pebbling game. It is further noted that quantum circuit may include one or more qubits that are not addressed or processed by the reversible pebbling game. Additionally, or alternatively, the quantum circuit may include gates, qubits and cycles that are not determined based on the pebbling game, and which the reversible pebbling game may not take into account.

In some exemplary embodiments, a gate-level implementation of the quantum circuit may be synthesized. The gate-level implementation may include the outcome of the dynamic generation as well as other non-dynamically generated portions of the quantum circuit, such as portions determined using the function library, portions pre-defined by a user, or the like. However, gates or other elements of the different portions may be connected or otherwise interact with one another in the quantum circuit.

In some exemplary embodiments, the disclosed subject matter may obtain a desired "shape" of a function that has changing depth and width, based on constraints on usage of additional qubits, such as a constraint on returning a dirty qubit in the same state, returning a qubit in a cleaned state, or the like. A dynamic gate-level block may be created from functional level block, as long as such gate-level blocks comply with the constraints on their usage of resources. As an example, the constraints may be no more than 4 qubits for 19 cycles and then no more than 7 qubits for 5 cycles. In contrast to a library that may provide constant, rectangular areas, having a constant number of qubits and number of cycles, e.g., 17×50 for the entire function, the disclosed subject matter may dynamically generate a specific implementation that is tailored for the specific requirements and constraints of the quantum circuit being analyzed. It is further noted that even in cases where the library is not limited to rectangular shapes and may include implementations with irregular shapes, representing timeframes in which specific qubits are not allocated for the implementation, the disclosed subject matter may not rely on having a specific shape in the library and instead may be configured to generate a specific case-tailored implementation fitting the specific constraints in the specific circuit.

In some exemplary embodiments, there may be a large number of alternative implementation that tradeoff between resources like, for example, accuracy, error, number of cycles and number of qubits. Alternatively, multiple instances can be created, and interpolation is possible to estimate other resources combinations. In some exemplary embodiments, the disclosed subject matter may use algorithms that use mixed continuous and discrete optimizations such as disclosed in Momchil Halstrup, "Black-box optimization of mixed discrete-continuous optimization problems", Doctoral Thesis, 14.07.2016, and Ru, B. et al., "Bayesian Optimisation over Multiple Continuous and Categorical Inputs". *Proceedings of the 37th International*

*Conference on Machine Learning*, in *Proceedings of Machine Learning Research* (2020), which are both incorporated by reference in their entirety for all purposes without giving rise to disavowment. In some exemplary embodiments, a function description may include two instances, each of which has parameter values (such as for number of qubits, error rate, or the like) and parametrical evaluation which describes large number of instances. Optimizations may be performed on both instances.

In some exemplary embodiments, functional blocks may be scheduled according to resource constraints, such as upon obtaining an indication of additional resources. In some exemplary embodiments, given constraints, functional blocks may fit into the number of qubits that are available. In some exemplary embodiments, a first optimization be performed for current rectangles, each of which represent a function, and for each there may be multiple instantiation available which present different rectangle size as well as different other conditions like the number of auxiliary released.

In some exemplary embodiments, dynamic generation of instances may utilize tradeoffs, such as a tradeoff between number of qubits and number of cycles. Referring now to FIG. 8A, it may be noted that using dynamic generation, Implementation 804 may be updated to utilize more qubits (e.g., become higher in height) but take fewer cycles (e.g., become narrower in width). Other tradeoffs given more local resources may be utilized. For example, there are 3 extra qubits that can be used but only between cycles #10-#57 of the function (the tenth cycle of the function and until the $57^{th}$ cycle). It may be impractical to prepare in advance all potential instances. Instead, dynamic generation may be utilized to address specific case-tailored needs.

One technical effect of utilizing the disclosed subject matter is to adjust the resource utilization without relying on a pre-prepared set of implementations. Dynamic generation may enable case-tailored solutions which may not necessarily be reusable in other cases, but may optimize the quantum circuit that is synthesized, with respect to an objective function.

Figure 9:
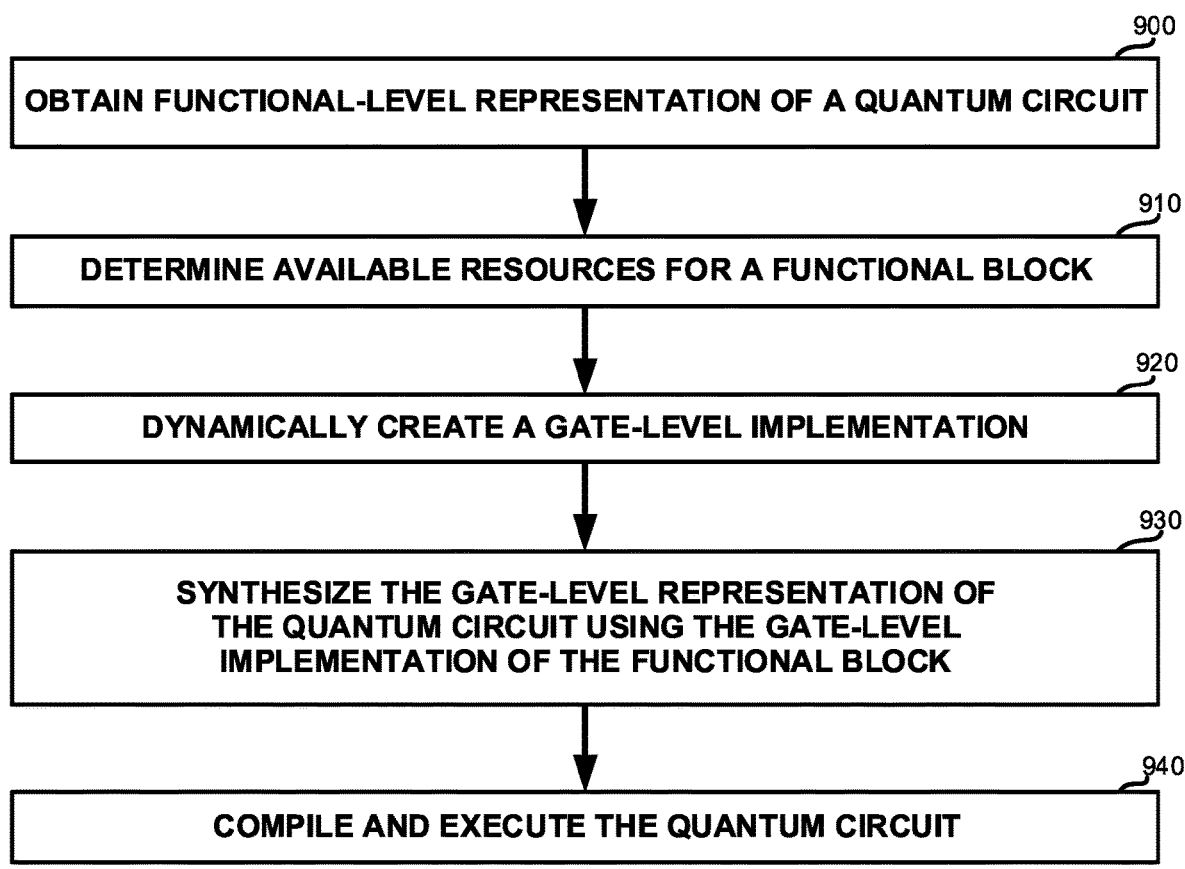
FIG. 9 shows a flowchart diagram of a method, in accordance with some exemplary embodiments of the disclosed subject matter.

Referring now to FIG. 9, showing a flowchart diagram of a method, in accordance with some exemplary embodiments of the disclosed subject matter.

On Step 900, a functional-level representation of a quantum circuit is obtained. The functional-level representation comprises at least a functional block and an external element thereto, such as another functional block, another gate, or the like. The functional block and the external element may interact with one another, such as via passing values therebetween.

On Step 910, resources available for the functional block may be determined. The determination may be based on an indication of available resources, such as regarding range of cycles, number of qubits, or the like. The indication may be received from a gate-level processing element, such as a gate-level compiler, that processed a previous version of the quantum circuit, modified the circuit, and re-invoked the functional-level processing element to improve the modified circuit, such as is exemplified in FIGS. 6-7. Additionally, or alternatively, the available resources for the functional block may be determined based on static analysis of the functional-level representation of the quantum circuit. It is noted that in some cases, a selection may first be made regarding one or more functional blocks of interest to be analyzed. The remaining portion of the circuit may be regarded as an external invariant to the selected blocks of interest or as an external changeable environment while ensuring specific resources are allocated to the blocks of interest.

In some exemplary embodiments, the indication may comprise one or more constraints on utilization of available resources. The constraints on utilization of resources may include, for example, a constraint on the cycles in which a qubit is available for usage, which may or may not be continuous range of cycles. The range of cycles in which the qubit is available may be a subset of the cycles of the block of interest, such as cycles in the beginning ending before the completion of the block of interest, cycles in the end starting after the commencement of the block of interest, cycles in an intermediate range starting after the block of interest started and before the block concluded its processing, or the like. Additionally, or alternatively, the constraints on utilization of resources may include constraints on the value of the qubit. In some cases, the constraint may ensure that the value is set of a specific value at a certain cycle, such as reset to its original state, set to the zero state, or the like.

On Step 920, a gate-level implementation for the block of interest may be created. The gate-level implementation may be created dynamically using any technique. In some cases, the gate-level implementation may be dynamically generated using reversible pebbling game. Additionally, or alternatively, the gate-level implementation may be dynamically generated using a predefined set of construction rules for parsing an arithmetic functional formula. Additionally, or alternatively, the gate-level implementation may be generated using stochastic methods, using genetic algorithms, using brute force enumeration on potential implementations, or the like.

On Step 930, the gate-level representation of the circuit may be synthesized. The synthesis may combine the gate-level implementation dynamically generated on Step 920 with gate-level portion of the external element. In some cases, the external element may a-priori be given in gate-level representation and may be used as is. Additionally, or alternatively, the external element may be given in functional-level representation and may be processed in accordance with the disclosed subject matter to determine its gate-level representation, such as using selection of implementations from the function library.

On Step 940, the gate-level representation synthesized on Step 930 may be compiled and executed.

Figure 10A:
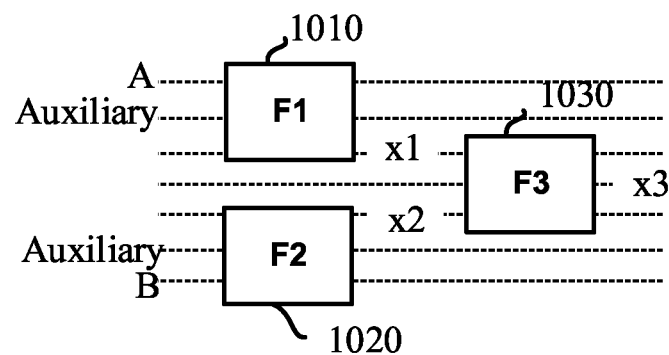
FIGS. 10A-10B show exemplary alternative scheduling of functional blocks, in accordance with some exemplary embodiments of the disclosed subject matter.
Figure 10B:
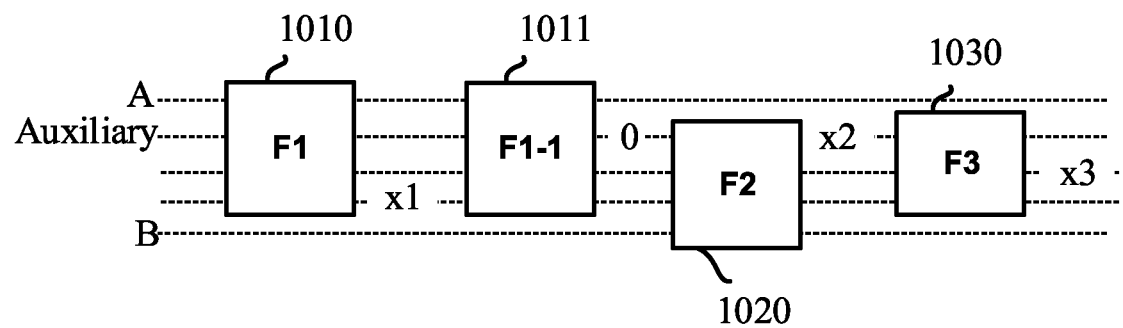

Referring now to FIGS. 10A-10B, depicting exemplary alternative scheduling of functional blocks of a DAG. In some exemplary embodiments, a DAG may represent a quantum circuit in a functional-level, in which each functional block is represented by a block. In some exemplary embodiments, temporal constraints between the functional blocks may be represented by edges connecting the blocks. In some exemplary embodiments, the program may comprise functional blocks, such as Function 1010 (denoted F1), Function 1020 (denoted F2), and Function 1030 (denoted F3).

In some exemplary embodiments, the DAG may indicate that Function 1030 obtains the output qubits from Functions 1010 and 1020, and is dependent on Functions 1010 and 1020. In some exemplary embodiments, the dependency may constitute a temporal constraint on the functional blocks, indicating that Function 1030 must be implemented after Functions 1010 and 1020. However, there may not be a temporal constraint between Functions 1010 and 1020, as they can be implemented simultaneously, one after the other, or the like, as long as they are both implemented before Function 1030. In some exemplary embodiments, scheduling the functional blocks of the DAG may comprise ordering and positioning Functions 1010, 1020, and 1030 in a manner that complies with the temporal constraints of the DAG.

As illustrated in FIG. 4A, a scheduler may schedule Functions 1010 and 1020 to be implemented in parallel, prior to implementing Function 1030.

As illustrated in FIG. 4B, a scheduler may schedule Functions 1010 and 1020 to be implemented sequentially, one after another, prior to implementing Function 1030. In some exemplary embodiments, Function 1020 may reuse one or more auxiliary qubits from Function 1010, which may reduce the overall qubits required for the program. Alternatively, a reversed order may be used, in which Function 1010 may reuse one or more auxiliary qubits from Function 1020. In some exemplary embodiments, an auxiliary qubit may be reused by placing an Inverse Function 1011 (denoted F1-1), which is configured to inverse the state of the auxiliary qubit after being used for Function 1010. Accordingly, after such operation, the auxiliary qubit may be considered "cleaned", and may be utilized as auxiliary qubit in subsequent functions, and specifically in Function 1020 to reduce the overall number of qubits. As is illustrated in FIG. 10B, Function 1010 is positioned before Function 1020, and Inverse Function 1011 inverses the auxiliary qubits that exits Function 1010, thereby providing to Function 1020 a clean auxiliary qubit to be utilized thereby, so as to enable re-use of a qubit and reduce the overall number of qubits required for the circuit. As can be appreciated such scheduling decisions may be performed at a functional-level, which is an abstraction of the gate-level representation and therefore is simpler, and has a reduced number of elements (e.g., a single functional block may be an abstraction of a sub-circuit which employs many gates, manipulating several qubits and spanning over several cycles). Additionally, or alternatively, the scheduling decision may be performed at the gate-level. Additionally, or alternatively, the scheduling decision may be performed in tandem to the selection of the optimal implementations to the functional blocks (e.g., Functions 1010, 1020, 1030, 1011), so as to attempt and optimize the solution while taking into account alternative valid scheduling decisions.

Figure 11A:
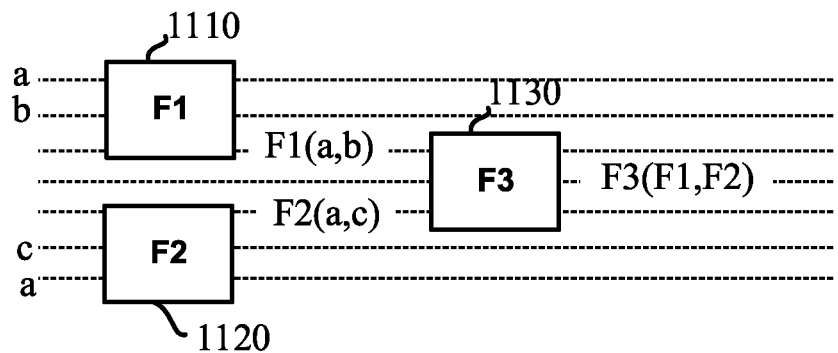
FIGS. 11A-11B show exemplary alternative scheduling of functional blocks, in accordance with some exemplary embodiments of the disclosed subject matter.
Figure 11B:
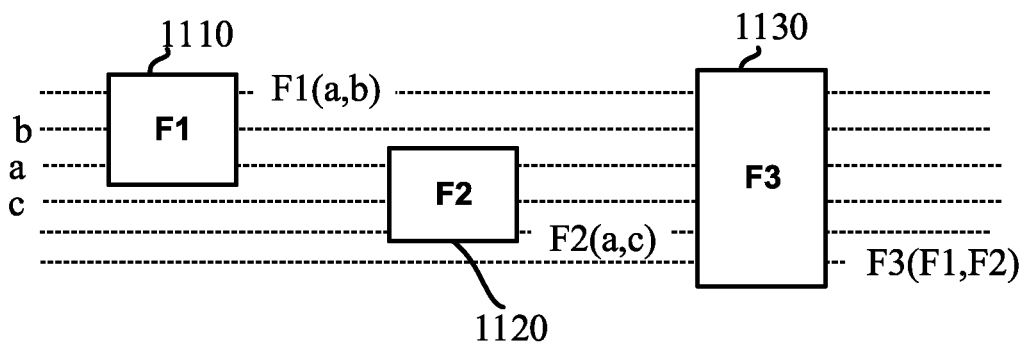

Referring now to FIGS. 11A-11B, depicting exemplary alternative scheduling of functional blocks of a DAG.

In some exemplary embodiments, inputs of some functions may be the outputs of others. In some cases, the same input may be utilized twice. As an example, consider the circuit of the following arithmetic formula: F3(F1(a, b), F2(a, c)). As can be appreciated the value "a" is used twice—both as an input of F1 and of F2. FIG. 11A shows an illustration of one scheduling decisions for such arithmetic formula. As can be appreciated Function F1 1110 and Function F2 1120 do not share a same input and instead two different qubits are used to represent the value "a". The output of such functions is provided for final manipulation by Function F3 1130. Overall the circuit uses 7 qubits.

In some exemplary embodiments, it may be possible to output the value "a" from Function F1 1110 and providing such value as input for Function F2 1120, to reduce the number of qubits required in the circuit illustrated in FIG. 11B to 6 qubits. It is noted that such manipulation may not always be valid in quantum computing. It may be determined automatically whether such manipulation can be utilized, depending on the functions, the computational basis of the inputs, or the like.

Figure 12:
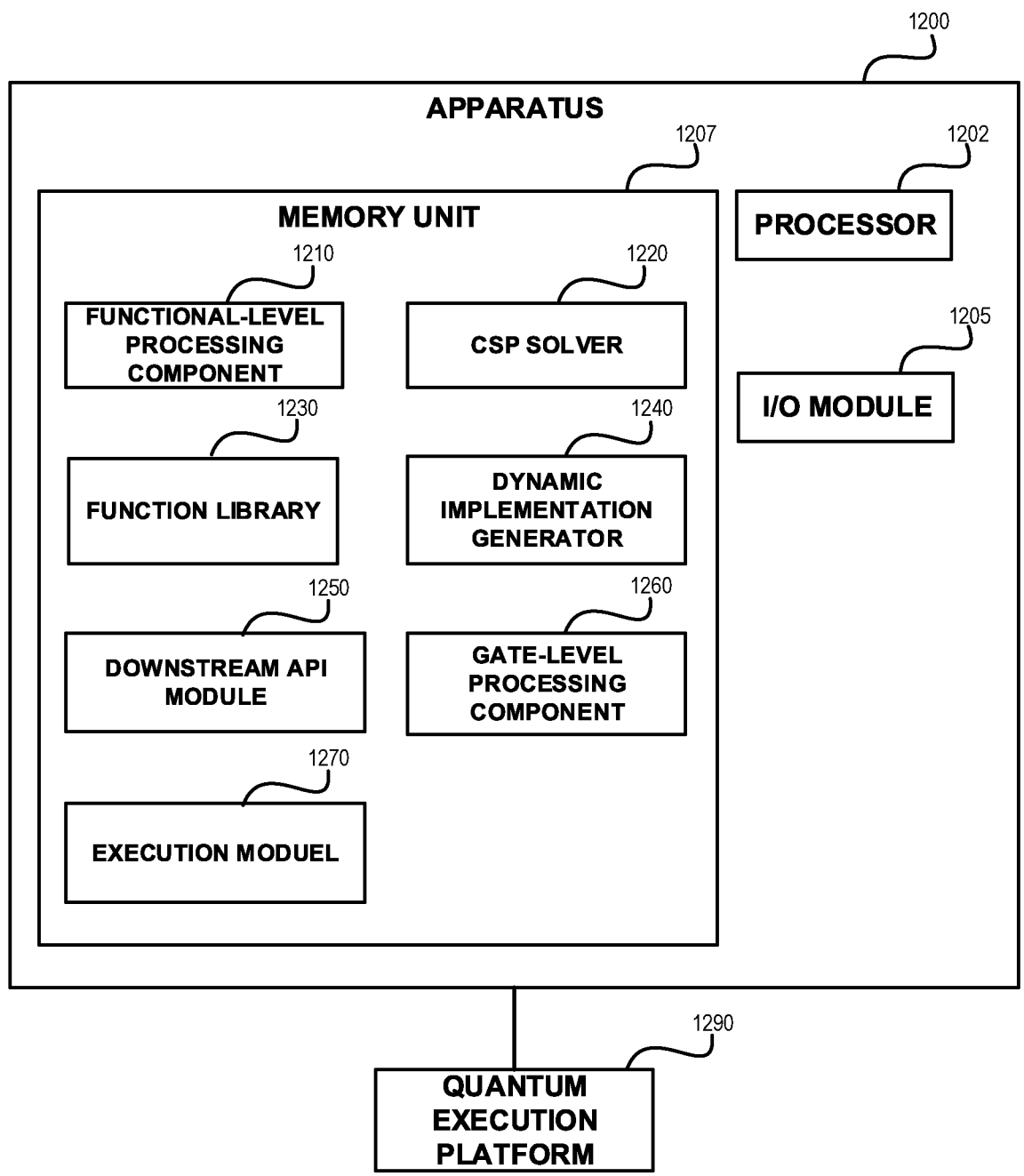
FIG. 12 shows a block diagram of an apparatus, in accordance with some exemplary embodiments of the disclosed subject matter.

Referring now to FIG. 12 showing a block diagram of an apparatus, in accordance with some exemplary embodiments of the disclosed subject matter.

In some exemplary embodiments, Apparatus 1200 may comprise one or more Processor(s) 1202. Processor 1202 may be a Central Processing Unit (CPU), a microprocessor, an electronic circuit, an Integrated Circuit (IC) or the like. Processor 1202 may be utilized to perform computations required by Apparatus 1200 or any of its subcomponents. It is noted that Processor 1202 may be a traditional processor, and not necessarily, a quantum processor.

In some exemplary embodiments of the disclosed subject matter, Apparatus 1200 may comprise an Input/Output (I/O) module 1205. I/O Module 1205 may be utilized to provide an output to and receive input from a user, such as, for example to obtain a user-defined quantum program, compilation instructions, optimization instructions, selection of an optimization criteria, provide output to the user, provide visualization of the quantum program, showing a DAG representing the quantum circuit, showing circuit illustrations, or the like.

In some exemplary embodiments, Apparatus 1200 may comprise Memory 1207. Memory 1207 may be a hard disk drive, a Flash disk, a Random Access Memory (RAM), a memory chip, or the like. In some exemplary embodiments, Memory 1207 may retain program code operative to cause Processor 1202 to perform acts associated with any of the subcomponents of Apparatus 1200. Memory 1207 may comprise one or more components as detailed below, implemented as executables, libraries, static libraries, functions, or any other executable components.

Functional-Level Processing Component 1210 may be configured to process a functional-level representation of a quantum circuit in accordance with the disclosed subject matter. In some exemplary embodiments, Functional-Level Processing Component 1210 may be configured to construct a DAG based on a provided quantum program utilizing functions. The DAG may include a function block representing the functions. Additionally, or alternatively, Functional-Level Processing Component 1210 may be configured to analyze the function-level representation of the quantum circuit to determine implementations for each functional block therein. The determination may be based on a selection of implementations from Function Library 1230, such as when taking into account different properties of each implementation. Additionally, or alternatively, the determination may be performed using Dynamic Implementation Generator 1240, which may be configured to dynamically generate an implementation for a specific function block while taking into account resources available thereto. In some exemplary embodiments, the determination may be performed by CSP Solver 1220 as a by-product of solving a CSP model representing the functional-level representation, where the solution may indicate which implementation to select. In some exemplary embodiments, Functional-Level Processing Component 1210 may be configured to generate a gate-level representation of the quantum circuit after its analysis. In some cases, the gate-level implementations may be inlined into the representation, replacing functional blocks with their determined implementations.

In some exemplary embodiments, Functional-Level Processing Component 1210 may process a quantum circuit in an iterative manner, replacing one functional block by its implementation. Additionally, or alternatively, several functional blocks may be processed in parallel. Additionally, or alternatively, an implementation of a functional block may comprise another functional block, and another iteration of the analysis of Functional-Level Processing Component 1210 may be performed, until no functional blocks remain in the outcome and a gate-level representation of the quantum circuit is synthesized.

In some exemplary embodiments, Gate-Level Processing Component 1260 may be configured to receive and process the gate-level representation of the quantum circuit provided by Functional-Level Processing Component 1210. In some exemplary embodiments, Gate-Level Processing Component 1260 may be a hardware-aware compiler, potentially implemented by a different vendor than that of the Functional-Level Processing Component 1210. In some exemplary embodiments, Gate-Level Processing Component 1260 may perform connectivity independent optimization on the gate-level representation of the quantum circuit, a hardware connectivity optimization on the gate-level representation of the quantum circuit, or the like. Gate-Level Processing Component 1260 may utilize metadata about implementations of functional blocks in its processing. For example, Gate-Level Processing Component 1260 may receive from Functional-Level Processing Component 1210, e.g., when invoked or via Downstream API Module 1250 artifacts regarding the implementations. The artifacts may include aids for identifying the implementation in the gate-level processing component, enabling functional-level insight at the gate-level analysis. In some exemplary embodiments, the artifacts may include properties of the implementation, such as insights into effects of execution (e.g., entanglement caused thereby, error rates, qubit release information, auxiliary qubit cleaning information, or the like), insights into potential executable instructions (e.g., uncompute procedure for cleaning qubits that were manipulated in the implementation), or the like. In some exemplary embodiments, Gate-Level Processing Component 1260 may utilize pre-prepared artifacts which have valuable information thereto, but which may require substantial processing resources that are unavailable during compilation. For example, the pre-prepared artifacts may be artifacts that take a long time to be computed—while during compilation the process should end in a relatively short time. As another example, the pre-prepared artifacts may be computed using a quantum computer, which may not necessarily be available during the compilation. In some cases, Gate-Level Processing Component 1260 may operate on a classic computer and not on a quantum computer. In some exemplary embodiments, Gate-Level Processing Component 1260 may compute a new artifact and utilize Downstream API Module 1250 to retain the new artifact in Function Library 1230 for future use, reducing computational resources required on a future encounter with the same implementation. In some exemplary embodiments, Gate-Level Processing Component 1260 may modify the gate-level representation and determine to provide Functional-Level Processing Component 1210 with an opportunity to optimize the circuit even further. In some cases, Gate-Level Processing Component 1260 may utilize Downstream API Module 1250 to provide a change indication to Functional-Level Processing Component 1210. Functional-Level Processing Component 1210 may take into account the change indication and synthesize a modified gate-level representation of the quantum circuit. In some exemplary embodiments, Functional-Level Processing Component 1210 may be configured to determine invariants in the quantum circuit based on the change indications, identify available resources to functional blocks, determine constraints on resources available for a functional block, determine constraints on interfaces between a functional block and external elements thereto, or the like. Using such determine and identified information, Functional-Level Processing Component 1210 may be configured to re-synthesize the quantum circuit, taking into account the changes imposed by Gate-Level Processing Component 1260, and provide Gate-Level Processing Component 1260 with a modified gate-level representation of the quantum circuit.

In some exemplary embodiments, Function Library 1230 may comprise for a function block several alternative gate-level implementations. Additionally, or alternatively, Function Library 1230 may comprise an implementation which may not be gate-level and may include at least one functional block therein. In some exemplary embodiments, each implementation may provide the same, or substantially similar (e.g., differing only in different precision) functionality as defined for the function block. In some exemplary embodiments, implementations may be relevant to some quantum computers, such as to specific types of target quantum execution platforms. Some implementations may not be applicable and therefore cannot be selected for a certain type of target quantum execution platform. In some cases, there may be more than a single option that is relevant for the target execution platform to be used to execute the quantum circuit (e.g., in this case, Quantum Execution Platform 1290). In some exemplary embodiments, Function Library 1230 may be pre-prepared in advance, such as using a long computation time, substantial computation resources, a quantum computer, or the like. The artifacts that are retained for each implementation may be re-used for different quantum circuits. In some cases, artifacts may be added to Function Library 1230 during the processing of a quantum circuit. In some cases, computations performed by Functional-Level Processing Component 1210 may be used to determine new artifacts and retain such artifacts in Function Library 1230 for future use. Additionally, or alternatively, new artifacts may be determined by Gate-Level Processing Component 1260, which may utilize Downstream API Module 1250 to pass such artifacts to be retained in Function Library 1230. In some cases, the artifacts determined by Gate-Level Processing Component 1260 may be utilized only by the same Gate-Level Processing Component 1260 or by components provided by the same vendor. Additionally, or alternatively, the artifacts may be restricted to be re-used by the same organization (e.g., organization that is preparing the quantum circuit), same user (e.g., user-level permission even within the same organization), or the like. Additionally, or alternatively, the artifacts may be restricted to be re-used only with respect to the same target quantum computer, so as to be used only for quantum circuits that are designated to be executed by the same target quantum computer. In some cases, the new artifact may be encrypted to avoid divulging confidential information and trade secrets of the vendor of Gate-Level Processing Component 1260.

In some exemplary embodiments, Execution Module 1270 may be configured to load the compiled quantum circuit onto Quantum Execution Platform 1290 to be executed thereby. In some exemplary embodiments, Execution Module 1270 may simulate execution of the quantum circuit using an emulator, a simulator, or the like instead of actual execution by Quantum Execution Platform 1290.

The present disclosed subject matter may be a system, a method, and/or a computer program product. The computer program product may include a computer readable storage medium (or media) having computer readable program instructions thereon for causing a processor to carry out aspects of the present disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), electrical signals transmitted through a wire, Quantum Random Access Memory (QRAM), photons, trapped ions, lasers, cold atoms, or the like.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server (or a group of multiple remote servers). In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter.

Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

What is claimed is:

1. A method comprising:
   obtaining a functional-level representation of a quantum circuit, wherein the functional-level representation of the quantum circuit comprises a functional block within the quantum circuit, wherein the functional block defines an operation of the quantum circuit over at least two cycles;
   selecting from a function library an implementation for the functional block, wherein the function library comprises a plurality of alternative implementations of the functional block, wherein each implementation of the plurality of alternative implementations is configured to provide a same functionality of the functional block and is applicable to a quantum computer to be used for executing the quantum circuit; and
   generating a gate-level representation of the quantum circuit, wherein the gate-level representation of the quantum circuit comprises the implementation for the functional block, wherein the gate-level representation of the quantum circuit comprises a set of qubits and a set of gates, wherein each gate of the set of gates defining operations on the set of qubits or portion thereof by the quantum circuit at a different cycle.

2. The method of claim 1, wherein each of the plurality of alternative implementations has properties, wherein said selecting is performed based on the properties.

3. The method of claim 2, wherein the properties comprise at least one of:
   a number of cycles of the alternative implementation;
   a number of qubits utilized by the alternative implementation;
   an entanglement caused by the alternative implementation;
   a number of auxiliary qubits utilized by the alternative implementation;
   a number of auxiliary qubits cleaned by the alternative implementation;
   a cycle in which an auxiliary qubit utilized by the alternative implementation is released;
   a computational cost of performing cleanup of the auxiliary qubit utilized by the alternative implementation; and
   an error rate of the alternative implementation.

4. The method of claim 2, wherein the properties of a first implementation comprise a first depth and a first number of qubits, wherein the properties of a second implementation comprise a second depth and a second number of qubits, wherein the first depth is larger than the second depth and the first number of qubits is smaller than the second number of qubits.

5. The method of claim 2, wherein at least a portion of the properties are determined using a pre-processing operation performed irrespective to the functional-level representation of the quantum circuit.

6. The method of claim 5, wherein said pre-processing operation is performed using quantum computing.

7. The method of claim 5, wherein said pre-processing requires at least 60 minutes.

8. The method of claim 1, wherein the functional block is implemented using at least two gates and at least two qubits.

9. The method of claim 1, further comprises:
   compiling the gate-level representation of the quantum circuit to synthesize an executable circuit for the quantum computer; and
   executing the executable circuit using the quantum computer.

10. The method of claim 9, wherein said compiling comprises:
    performing a connectivity independent optimization on the gate-level representation of the quantum circuit; and
    performing a hardware connectivity optimization on the gate-level representation of the quantum circuit.

11. The method of claim 9, wherein said compiling comprises: assigning physical qubits in the quantum computer to the set of qubits defined in the gate-level representation of the quantum circuit.

12. The method of claim 1, wherein the functional-level representation of the quantum circuit further comprises a second functional block within the quantum circuit, wherein the functional block and the second functional block are defined by the functional-level representation to co-operate via an interface.

13. The method of claim 1, wherein the functional-level representation of the quantum circuit comprises a gate-level representation of a portion of the quantum circuit in addition to the functional block representing another portion of the quantum circuit.

14. The method of claim 1, wherein the functional-level representation of the quantum circuit comprises two instances of the functional block, wherein said selecting is performed with respect to each of the two instances of the functional block, wherein for each instance a different alternative implementation is selected from the function library.

15. The method of claim 14, wherein said selecting is performed using a different optimization criterion for each of the two instances.

16. The method of claim 1, wherein said selecting is performed based on hard constraints that must be met by the quantum circuit, wherein said selecting is further based on an optimization criterion regarding the quantum circuit.

17. The method of claim 16, wherein the optimization criterion is based on a criterion selected from:
    a minimal number of qubits; and
    a minimal number of cycles.

18. An apparatus comprising a processor and coupled memory, said processor being adapted to:
    obtain a functional-level representation of a quantum circuit, wherein the functional-level representation of the quantum circuit comprises a functional block within the quantum circuit, wherein the functional block defines an operation of the quantum circuit over at least two cycles;

select from a function library an implementation for the functional block, wherein the function library comprises a plurality of alternative implementations of the functional block, wherein each implementation of the plurality of alternative implementations is configured to provide a same functionality of the functional block and is applicable to a quantum computer to be used for executing the quantum circuit; and generate a gate-level representation of the quantum circuit, wherein the gate-level representation of the quantum circuit comprises the implementation for the functional block, wherein the gate-level representation of the quantum circuit comprises a set of qubits and a set of gates, wherein each gate of the set of gates defining operations on the set of qubits or portion thereof by the quantum circuit at a different cycle.

19. The apparatus of claim 18, wherein the gate-level representation is devoid of any block that defines a function over more than a single cycle.

20. A computer program product comprising a non-transitory computer readable medium retaining program instructions, which program instructions when read by a processor, cause the processor to:

obtain a functional-level representation of a quantum circuit, wherein the functional-level representation of the quantum circuit comprises a functional block within the quantum circuit, wherein the functional block defines an operation of the quantum circuit over at least two cycles;

select from a function library an implementation for the functional block, wherein the function library comprises a plurality of alternative implementations of the functional block, wherein each implementation of the plurality of alternative implementations is configured to provide a same functionality of the functional block and is applicable to a quantum computer to be used for executing the quantum circuit; and generate a gate-level representation of the quantum circuit, wherein the gate-level representation of the quantum circuit comprises the implementation for the functional block, wherein the gate-level representation of the quantum circuit comprises a set of qubits and a set of gates, wherein each gate of the set of gates defining operations on the set of qubits or portion thereof by the quantum circuit at a different cycle.

* * * * *